United States Patent
Title et al.

(10) Patent No.: US 8,429,633 B2
(45) Date of Patent: Apr. 23, 2013

(54) MANAGING MEMORY TO SUPPORT LARGE-SCALE INTERPROCEDURAL STATIC ANALYSIS FOR SECURITY PROBLEMS

(75) Inventors: Richard Title, Arlington, MA (US); Benjamin Greenwald, Framingham, MA (US); John Peyton, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 12/275,838

(22) Filed: Nov. 21, 2008

(65) Prior Publication Data

US 2010/0131721 A1   May 27, 2010

(51) Int. Cl.
G06F 9/44 (2006.01)
G06F 9/45 (2006.01)

(52) U.S. Cl.
USPC ........... 717/152; 717/132; 717/133; 717/156; 717/157

(58) Field of Classification Search ................. None
See application file for complete search history.

(56) References Cited

U.S. PATENT DOCUMENTS

| | | | | |
|---|---|---|---|---|
| 5,555,399 A * | 9/1996 | Waldron et al. | ............... | 711/159 |
| 5,655,122 A * | 8/1997 | Wu | ............... | 717/152 |
| 5,794,256 A * | 8/1998 | Bennett et al. | ............. | 707/999.1 |
| 5,854,924 A * | 12/1998 | Rickel et al. | ............... | 717/132 |
| 5,920,723 A * | 7/1999 | Peyton et al. | ............... | 717/157 |
| 6,212,613 B1 * | 4/2001 | Belair | ............... | 711/207 |
| 6,684,393 B1 * | 1/2004 | Loen et al. | ............... | 717/151 |
| 6,823,507 B1 * | 11/2004 | Srinivasan et al. | ............ | 717/152 |
| 7,028,293 B2 * | 4/2006 | Ruf | ............... | 717/152 |
| 7,240,332 B2 * | 7/2007 | Berg et al. | ............... | 717/126 |
| 7,437,718 B2 * | 10/2008 | Fournet et al. | ............... | 717/133 |
| 7,526,758 B2 * | 4/2009 | Hasse et al. | ............... | 717/133 |
| 7,669,193 B1 * | 2/2010 | Chipman | ............... | 717/152 |
| 7,849,509 B2 * | 12/2010 | Venkatapathy et al. | ...... | 717/132 |

(Continued)

OTHER PUBLICATIONS

Thomas Reps et al., Improved Memory-Access Analysis for x86 Executables, 2008, [Retrieved on Jul. 9, 2012]. Retrieved from the internet: <URL: http://www.springerlink.com/content/5534w6613062h014/fulltext.pdf> 20 Pages (16-35).*

(Continued)

*Primary Examiner* — Don Wong
*Assistant Examiner* — Anibal Rivera
(74) *Attorney, Agent, or Firm* — Holland & Knight LLP; Brian J. Colandreo, Esq.; Michael T. Abramson, Esq.

(57) ABSTRACT

Embodiments of the invention describe systems and methods for application level management of virtual address space. A static analysis application can model and analyze a large and complex source code listing to determine whether it has vulnerabilities without exhausting the virtual memory resources provided to it by the operating system. In one embodiment of the invention, the method includes analyzing the source code listing to create a call graph model to represent the expected sequences of routine calls as a result of the inherent control flow of the source code listing. The method also includes monitoring the amount of virtual memory resources consumed by the dynamic state, and swapping out to a storage medium a portion of the dynamic state. The method includes reusing the virtual memory resources corresponding to the swapped out portion of the dynamic state to continue analyzing the source code listing.

26 Claims, 24 Drawing Sheets

U.S. PATENT DOCUMENTS

| | | | | |
|---|---|---|---|---|
| 7,856,627 | B2* | 12/2010 | Archambault et al. | 717/152 |
| 8,122,430 | B2* | 2/2012 | De Sutter et al. | 717/152 |
| 8,132,150 | B2* | 3/2012 | De Sutter et al. | 717/152 |
| 8,141,064 | B2* | 3/2012 | Chipman | 717/152 |
| 8,166,464 | B2* | 4/2012 | Lin et al. | 717/132 |
| 2003/0188121 | A1* | 10/2003 | Roy et al. | 711/171 |
| 2005/0015562 | A1* | 1/2005 | Goodsell | 711/170 |
| 2005/0240806 | A1* | 10/2005 | Bruckert et al. | 714/6 |
| 2006/0253498 | A1* | 11/2006 | Barrs et al. | 707/200 |
| 2007/0271617 | A1* | 11/2007 | Mitomo et al. | 726/25 |
| 2009/0164983 | A1* | 6/2009 | Singla | 717/151 |
| 2009/0276205 | A1* | 11/2009 | Jennings et al. | 703/26 |

OTHER PUBLICATIONS

Gang Zhao, Data-flow Based Analysis of Java Bytecode Vulnerability, IEEE 978-0-7695-3185-4/08, 2008, [Retrieved on Jul. 9, 2012]. Retrieved from the internet: <URL: http://ieeexplore.ieee.org/stamp/stamp.jsp?tp=&arnumber=4597080> 7 Pages (647-653).*

Alexander Ivanov et al., Automatic Vulnerability Detection Using Static Source Code Analysis, 2005, [Retrieved on Jun. 25, 2012]. Retrieved from the internet: <URL: http://bluecoat-02/?cfru=aHR0cDovL2NpdGVzZWVyeC5pc3QucHN1LmVkdS92aWV3ZG9jL2Rvd25sb2FkP2RvaT0xMC4xLjEuNjAuOTY0NiZyZXA9cmVwMSZ0eXBlPXBkZg==> 118 Pages.*

* cited by examiner

T = points at which Interprocedural Analysis calls into FreeUpMemory

*constant and non-constant data are separated to different swap files*

*A managed object Fum holding a field referencing another managed object Foo*

```
m_foo->method_in_foo(); // This line of code
automatically swaps in the Foo object if neces-
sary before calling its method_in_foo() method,
by virtue of the overloaded operator-> in the de-
scriptor
```

ManagedObject base class

```
protected:  // virtual methods virtual void computeSize(
        unsigned int& constant_size,
        unsigned int& dynamic_size) = 0;                    ◄── 2001 virtual void serialize(
        Bytes & constant_bytes,
        size_t& constant_bytes_offset,
        Bytes & dynamic_bytes,                              ◄── 2002
        size_t& dynamic_bytes_offset) = 0;

virtual void deserialize(
        const Bytes & constant_bytes,
        size_t& constant_bytes_offset,                      ◄── 2003
        const Bytes & dynamic_bytes,
        size_t& dynamic_bytes_offset) = 0;

private:   // data fields

// 32-bit id identifying the object in its swappable unit
    unsigned int m_object_id;

// We remember a pointer to our containing swappable unit
    // in order to manufacture our descriptor.
    // Once our descriptor is manufactured,
    // we remember that instead.
    // So, the following field is either:
    // - a 32-bit pointer to our containing swappable unit   2004
    // - a 32-bit pointer to our descriptor
    //   (in this case the 1 in the low-order bit
    //    is masked out - see next field)
    // If the m_has_descriptor flag is 1, it is the latter
    union {
            ManagedObjectRoot_ptr m_containing_swappable_unit;

DescriptorBase_ptr m_descriptor; ◄───1906
            // The following flag is true if the low bit is 1
            mutable unsigned int m_has_descriptor;
    } m_union;
```

Figure 20

Descriptor base class:

```
private: //data fields

// The root id identifies our swappable unit
unsigned int m_root_id;                                    2103

// For space efficiency we use a union here.
// This takes advantage of the fact that we need
// the pointer-to-underlying when swapped in,
// and the object id when swapped out. It also
// takes advantage of the fact that a pointer
// cannot have a 1 in the low bit.
// So, the following union is either:
// - an 31-bit object id identifying which object
// in the swappable unit this is, or
// - a pointer to the underlying object
// If the m_swapped_out flag has low bit 1,
// the object is swapped out
// and the field contains the object_id.
// If the m_swapped_out flag has low bit 0,
// the object is swapped in
// and the field contains a pointer to the underlying.
union {
        unsigned int m_swapped_out;
        // Shift right by 1 bit to extract the object id
        unsigned int m_object_id;
        ManagedObject_ptr m_underlying_addr;       1907
} m_union;
```

2101

Descriptor template class:

```
template<class T> class Descriptor : public DescriptorBase
{
    ...
    /**
     * Overloaded *
     */
    T& operator*()
    {
            return *static_cast<T *>(getUnderlying());
    }

/**
     * Overloaded ->
     */
    T * operator->()
    {
            return static_cast<T *>(getUnderlying());
    }
    ...
}
```

2102 figure 21

MANAGING MEMORY TO SUPPORT LARGE-SCALE INTERPROCEDURAL STATIC ANALYSIS FOR SECURITY PROBLEMS

BACKGROUND OF THE INVENTION

1. Field of the Invention

The invention is in the field of application-level memory management in computer software systems. It specifically relates to techniques for managing memory in security-analysis systems to keep memory usage within the available virtual memory bounds, and to enable security analysis of larger target applications.

2. Description of the Related Art

Modern computing uses memory management techniques provided by the operating system. In short, the computer typically has a fixed amount of actual memory, and the operating system effectively creates the illusion to applications running on the computer system that they not only can use the memory by themselves but that the amount of memory is larger than the actual amount. This is typically referred to as "virtual memory" and very typically the memory—whether actual or virtual is allocated and managed in fixed sized units known as "pages." The application programs are completely ignorant of the virtual memory mechanics. See, e.g., "Modern Operating Systems" by Andrew Tanenbaum.

"Pointer swizzling" is a known application-level technique for addressing the situation in which an application is consuming a larger amount of memory than the virtual memory limit. In short, the pointer-swizzling system moves pages of memory between persistent memory (on disk) and transient memory (in the application's virtual address space), fixing up ("swizzling") pointers to objects residing in that memory as it does so. See, e.g., "Pointer Swizzling at Page Fault Time" by Paul Wilson and Sheetal Kakkad or U.S. Pat. No. 5,794,256 ("Pointer Swizzling Facility Using Three-State References to Manage Access to Referenced Objects")

Another prior art system is described in U.S. Pat. No. 5,920,723 ("Compiler with Inter-procedural Optimization"). This describes a compiler that swaps intermediate program representation to and from disk at a compilation-unit granularity, to support interprocedural optimizations when the entire program representation does not fit in virtual memory. This system is performing application level memory management in the context of a compiler. This is relevant because it is doing swapping at the C++ object level, and it is swapping similar sorts of objects as we are, i.e. objects that are part of the intermediate representation of a computer program.

SUMMARY OF THE INVENTION

Embodiments of the invention describe systems and methods for application level management of virtual address space. In this way, a static analysis application can model and analyze a large and complex source code listing to determine whether it has vulnerabilities without exhausting the virtual memory resources provided to it by an operating system of the computer system on which the static analysis application operates. In one embodiment of the invention, the method includes analyzing the source code listing to create a call graph model to represent the expected sequences of routine calls as a result of the inherent control flow of the source code listing. The method also includes analyzing the source code listing while traversing the call graph model, and during traversal of the call graph model, generating dynamic state representing expected transformations of program variables as a result of the expressions in the source code listing and as a result of the inherent control flow. The method also includes monitoring the amount of virtual memory resources consumed by the dynamic state. The method also includes determining whether a predetermined amount of virtual memory resources have been consumed by the dynamic state, and if a predetermined amount of virtual memory resources have been consumed, the method swaps out to a storage medium a portion of the dynamic state. The method also includes reusing the virtual memory resources corresponding to the swapped out portion of the dynamic state to continue analyzing the source code listing, and generating a report that identifies detected vulnerabilities in the source code listing, the report being usable by a user so that the user may address the identified vulnerabilities.

Embodiments of the invention also include traversing of the call graph model and propagating, at each call cite, accumulated knowledge about arguments at the call cite to formal parameters of the called routine. Embodiments of the invention also include, when swapping out to a storage medium the portion of the dynamic state, separating the portion of the dynamic state into a constant data portion and a non-constant data portion. The method also includes storing the constant data portion to a first swap file on the storage medium, storing the non-constant data portion to a second swap file on the storage medium. Embodiments of the invention also include using a free list to find an available segment of the second swap file to use for storing the non-constant data portion in the second swap file. Embodiments of the invention also include checking the amount of free memory, and storing the portion of the dynamic state from memory to a swap file only when the amount of free memory is below a threshold.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements:

FIG. 8 shows how our Memory Management base classes integrate with the objects from FIG. 3. It is at the point where we finally start to show where our Memory Management invention fits in.

FIG. 17 shows the flow of events in a swap-in.

FIG. 20 shows the structure of a single managed-object base class.

FIG. 21 shows the structure of a single descriptor.

FIG. 22 shows a managed object shared between two swappable units, and illustrates the two ways our invention can deal with that.

DETAILED DESCRIPTION OF EMBODIMENTS OF THE INVENTION

Embodiments of the invention provide methods and systems for security-analysis to overcome the virtual memory limit of the underlying computer architecture and operating system. This is particularly helpful for static analysis of large and complex target computer programs and particularly so for inter-procedural static analysis. The method works by swapping to disk C++ objects used to model and analyze the target application. (The C++ objects are in executable form at this point, but the logic to manage the swapping works on the C++ object-level of organization, more below.) Swapping overhead is kept to a minimum by grouping related objects into swappable units that are swapped together. Swapped-out objects are replaced by descriptors, which use templates to minimize the code changes in the security tool. The memory-management sub-system is implemented as a set of base classes, so it can be flexibly layered under a variety of systems, including security-analysis systems, in a transparent way.

Embodiments of the invention provide a sub-system for managing memory and its application to security-analysis systems, notable aspects of which included the following:

Flexible granularity of swappable units in order to deal with the highly dynamic nature of memory usage during security analysis.

A way of re-using the swapping logic to efficiently estimate memory-in-use and thus decide when it is a good time to swap.

Separation of constant from non-constant data at swap time to reduce swapping overhead.

The detailed description proceeds top-down as follows: First, we describe the Security Analysis system to which our Memory Management invention was applied. Then we describe the Interprocedural Analysis subsystem in some detail, and describe how our Memory Management system was applied to that subsystem to overcome its memory limitations. Then, we describe the principles and operations of the Memory Management invention itself, including its data structures and C++ mechanisms. Finally, in the context of discussing other embodiments, we discuss the portable nature of the Memory Management system, and how it could be applied to other subsystems of a Security Analysis system, or even to entirely different problem domains.

Description of the Security-Analysis System

Figure 1:
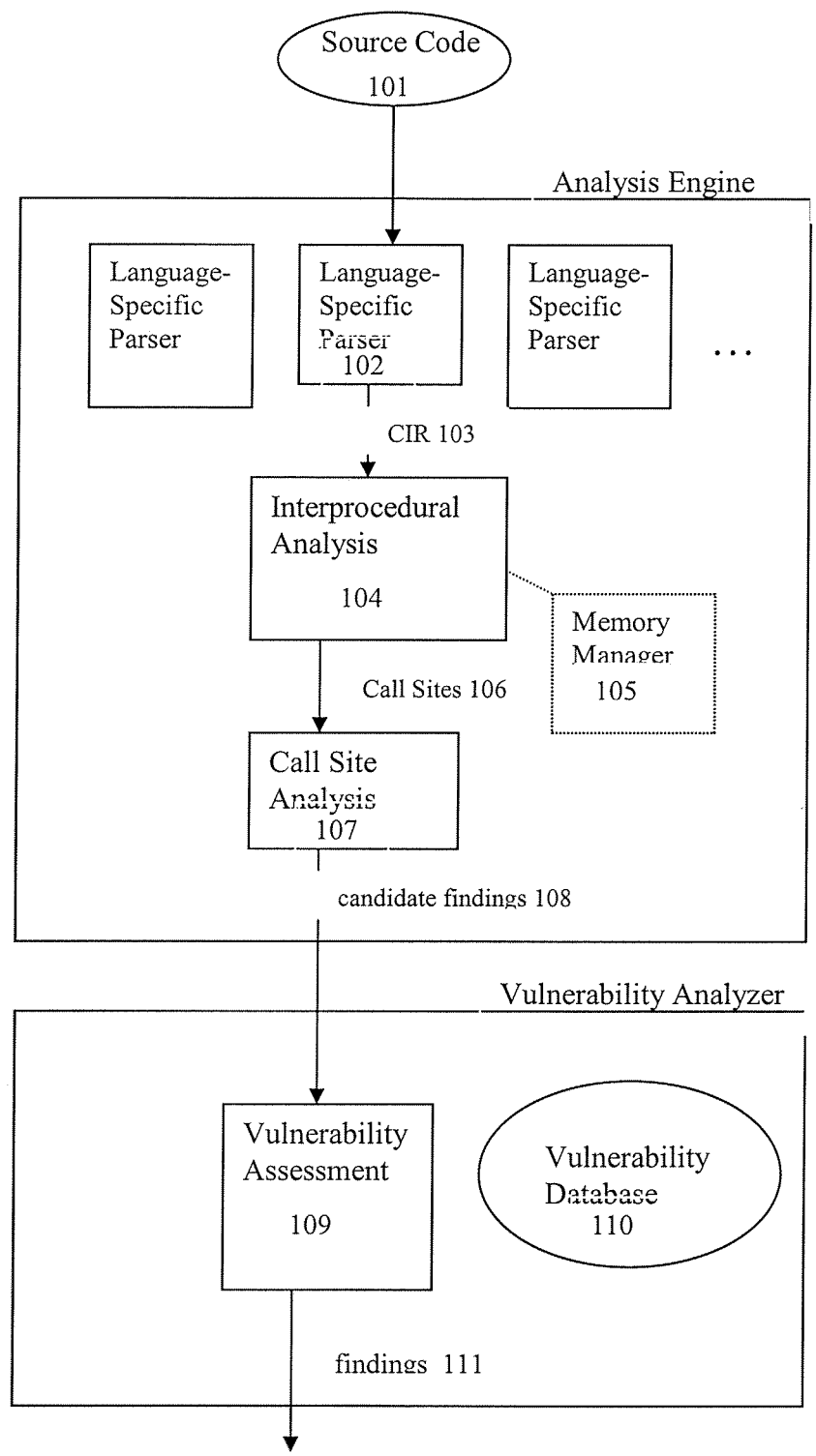
FIG. 1 shows the overall structure of the Security Analysis system.

FIG. 1 is an architectural diagram of the overall structure of the Security Analysis system. (The security analysis system was first described in U.S. Pat. No. 7,240,332 "Method and System for Detecting Vulnerabilities in Source Code," which is hereby incorporated by reference in its entirety). The Security Analysis system is capable of performing analyses of target applications to find potential security vulnerabilities in those target applications. FIG. 1 follows the flow of logic through the components of the Security Analysis system as one such target application is being analyzed. Source code of the target application 101 is parsed by one of a set of Language-Specific Parsers 102 into a common intermediate representation (CIR) 103. This intermediate representation is fed into an Interprocedural Analysis engine 104, which performs a form of a simulation on the CIR representation to determine where security vulnerabilities might exist. This is very memory intensive. The output of Interprocedural Analysis is a set of places in the program, called Call Sites 106, where security vulnerabilities might exist. These are aggregated by the Call Site Analysis subsystem 107, before being passed as candidate findings 108 to the Vulnerability Assessment subsystem 109. This consults a Vulnerability Database 110 to determine a final list of findings 111 for the user. The user can then use this information to correct the security vulnerabilities in the target application. As will be described in more detail below, the Memory Manager 105 is a library of code that can be applied to software components to control their memory usage by swapping objects to disk. As shown in FIG. 1, the Memory Manager is applied to the Interprocedural Analysis component of the Security Analysis system to control its memory usage.

Figure 2:
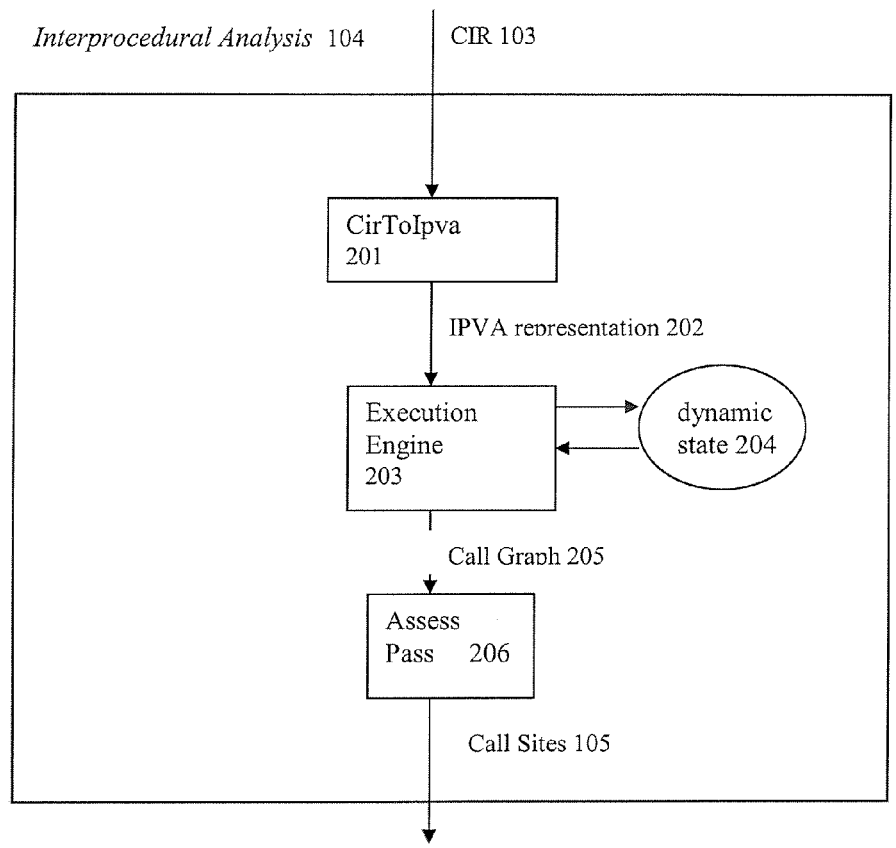
FIG. 2 shows the structure of Interprocedural Analysis 104 (an element of FIG. 1).

FIG. 2 is an architectural diagram showing the Interprocedural Analysis subsystem 104 in more detail. The incoming CIR 103 is first translated by the (CirToIpva) module 201 into an (IPVA) representation 202, which is suitable for interprocedureal vulnerability analysis (IPVA) (this IPVA representation is simply another representation of the target application, but one that is more amenable to interprocedural analysis and will be further described below). The IPVA representation is fed into the Execution Engine 203. The execution engine performs a form of symbolic simulation of the target application being analyzed. As it does so, it is building up a large amount of dynamic state 204 representing potential values or ranges of values of variables at various points in the simulated execution. The dynamic state 204 is representing the propagation of taint through the target application. The output of the execution is a dynamic call graph 205 annotated with information about where execution of vulnerable code might have happened. The Assess Pass 206 represents one final walk of that call graph to extract the potentially vulnerable call sites 105.

Figure 3:
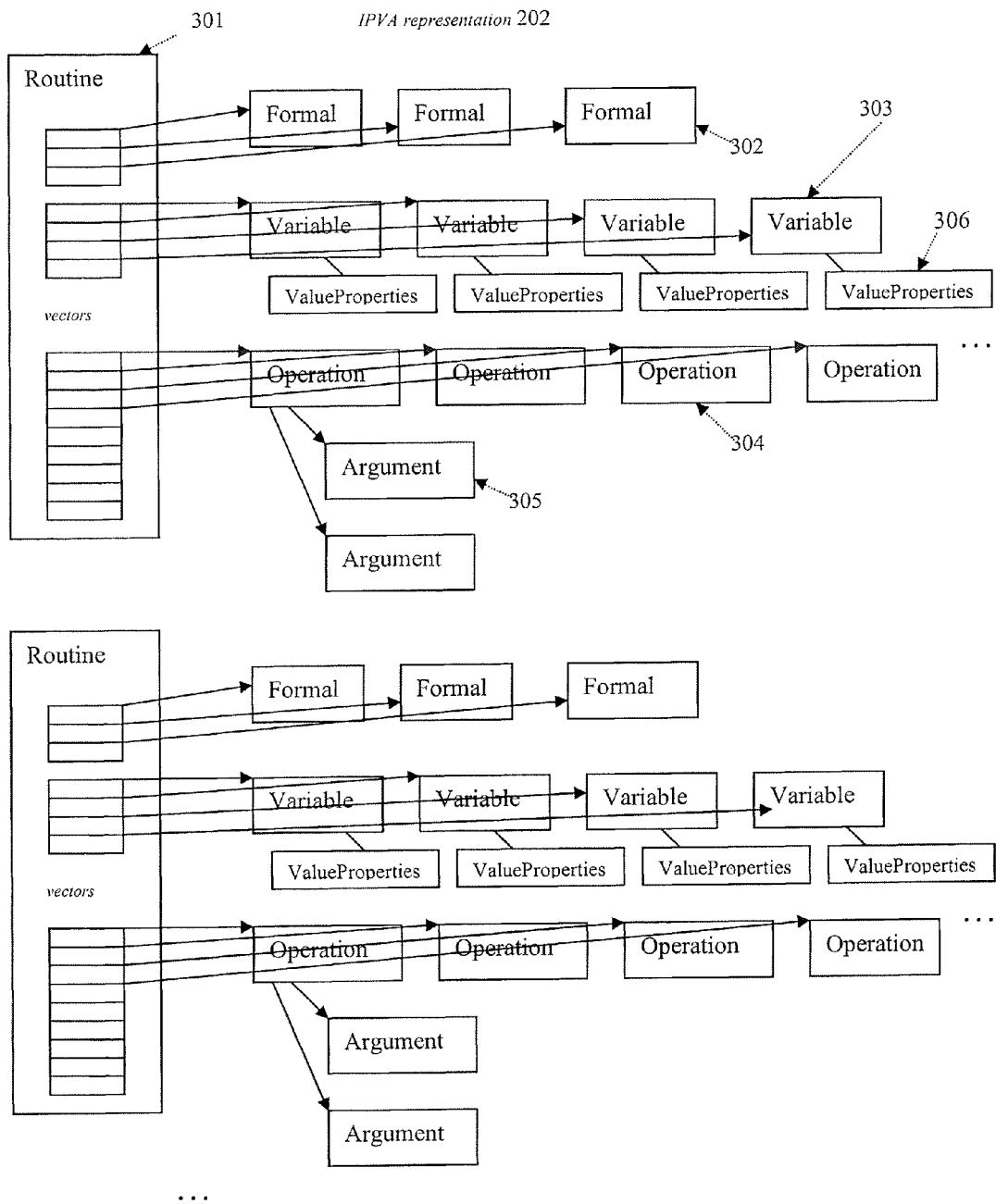
FIG. 3 illustrates the objects that constitute the IPVA representation 202 (an element of FIG. 2).

FIG. 3 depicts an exemplary IPVA representation 202 in more detail. The boxes represent individual in-memory C++ objects, in this case objects that represent entities in the target application. The overall IPVA representation is segregated into a (possibly large) number of Routines, each representing one routine/procedure/function/method in the target application. Item 301 depicts one such Routine. The Formals 302 are the objects representing formal arguments passed to that routine, i.e. the parameters that are input to the routine when it is invoked or called. The Variables 303 are the objects representing variables declared in that routine. The ValueProperties 306 are objects representing what is known about the value of each variable; initially these are set to a value representing "uninitialized". The Operations 304 are the objects representing statements (operations) in the routine. The Argument's 305 are the objects representing arguments to those operations. For example, consider this tiny C routine that might be a small part of the target application:

```
int foo (int x) {
    int y;
    y = 2 * x;
    return y;
}
```

A Routine object 301 would represent "foo" as a whole; a Formal object 302 would represent "x"; a Variable object 303 would represent "y"; An assignment "Operation" object 304 would represent "y=2*x"; and Argument objects 305 associated with this assignment operation would represent the left-hand-side "y" and the right-hand-side "2*x".

Figure 4:
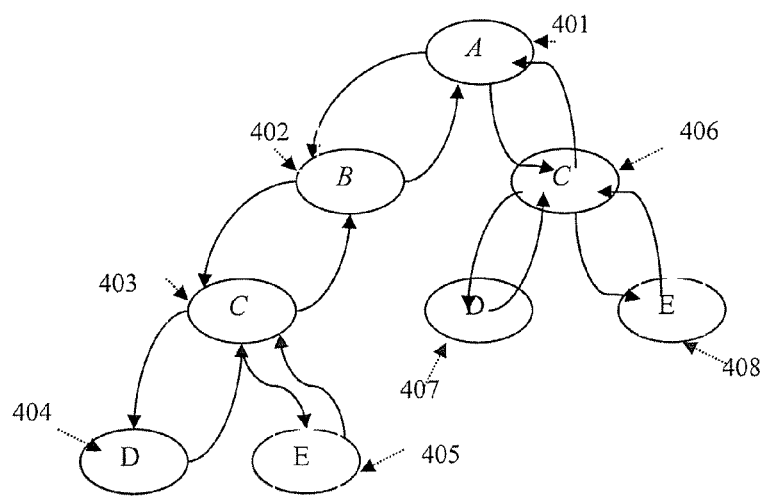
FIG. 4 shows the flow of control of the Execution Engine 203 as it analyzes a sample program.

Let us consider how the Execution Engine 203 operates on the above representation. The Execution Engine is simulating the target application by walking or iterating through each of the Operations of each Routine, simulating the calls and returns among those operations and thereby constructing a dynamic callgraph as it goes. The callgraph is a data structure retained in memory to model the flow of execution and may be used to facilitate analysis of the target application. FIG. 4 is an exemplary callgraph and illustrates the flow of this simulated execution. In this figure, 401, 402, 403, 404, 405, 406, 407, and 408 represent simulated visits to routines A, B, C, D, E, C, D, and E, respectively. In this example, the routine C is called from two different places, and hence the routines C, D, and E each appear twice in this flow. A sample program structure corresponding to this dynamic callgraph might be:

```
A( ) {
    B( );
    C( );
}
B( ) {
    C( );
}
C( ) {
    D( );
    E( );
}
```

Figure 5:
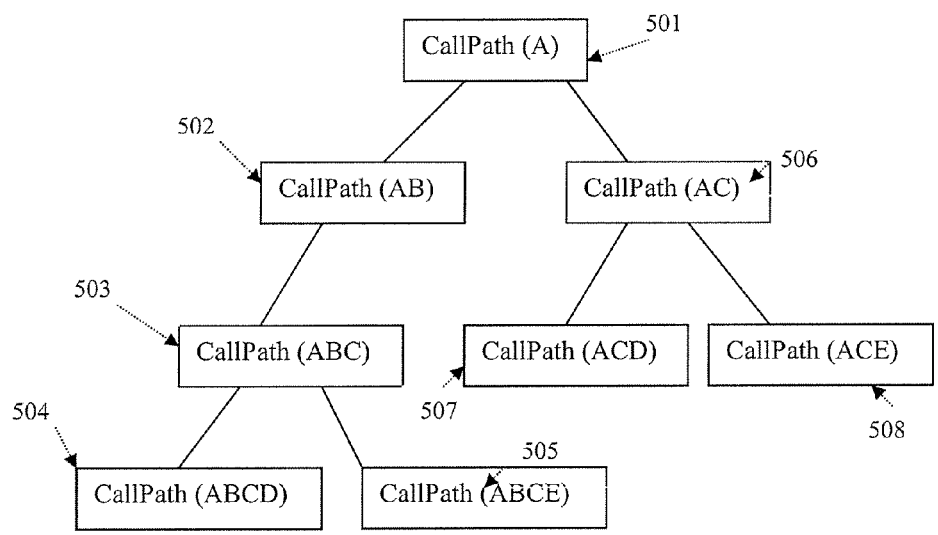
FIG. 5 shows the data structures that are built during the execution of the flow-of-control from FIG. 4.

FIG. 5 is another exemplary callgraph and may be considered an example of the Call Graph 205 of FIG. 2. The CallGraph objects in this picture are actual C++ objects stored in memory. The C++ objects 501, 502, etc. correspond to the call graph nodes 401, 402, etc of FIG. 4.

The flow shown in FIG. 4 is a simulation of the target application. This differs from an actual execution of the target application because we do not have actual values of variables. Instead, we use ValueProperties objects as stand-ins for the actual data values. ValueProperties are objects that say what we know about the value of the variable (i.e. what properties it has). For example, if the target application reads input from the user and assigns the input to variable X, we do not know what input the user is going to enter when the target application is actually executed. But in this case we do give the variable X the property of being "tainted", meaning it contains data that came from a (potentially malicious) user. If a value is tainted, we are interested not merely in the fact that the value is tainted, but also in the path the taint followed. Likewise, if from analysis of the target application we know that a variable is constrained to a set or range of values because of the actual statements or expressions in the target application, then the ValueProperties would model this range of possible values.

Figure 6:
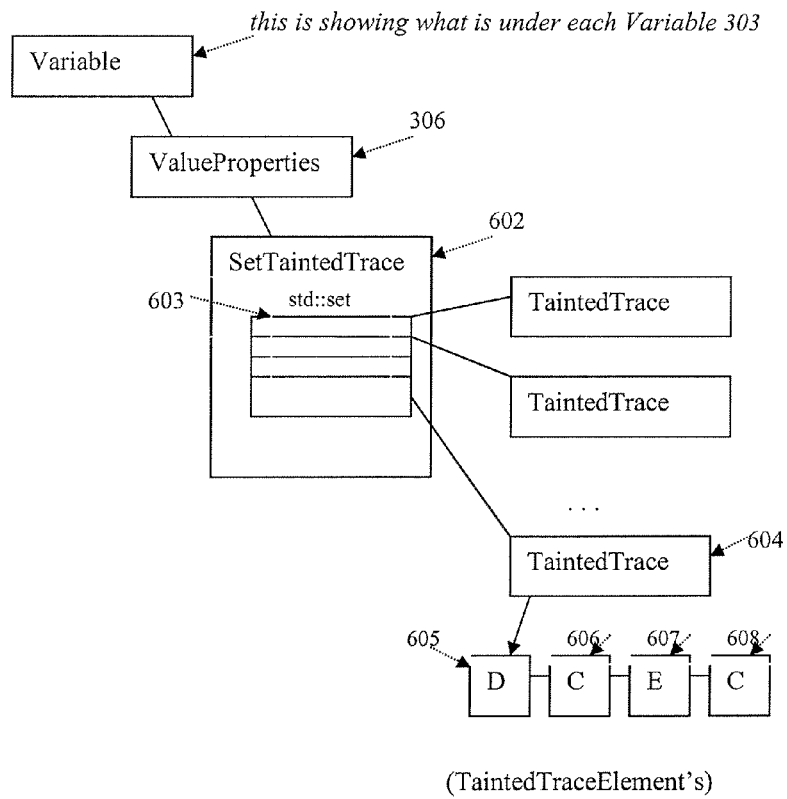
FIG. 6 shows some of the objects that are created by the Execution Engine 203 as it analyzes the target application. These hang off the ValueProperties objects 306 from FIG. 3.

FIG. 6 depicts the hierarchical relationship of certain data structures for modeling variables within a Routine. More specifically, it shows the structures used to model information for the Variable objects 303 and ValueProperties objects 306 from FIG. 3. A ValueProperties object models a variable's value. Being "tainted" is one possible aspect of this value. We say a variable's value is tainted if it has received its value from user input. For example on the statement "x=readstring( );", x's value becomes tainted assuming that readstring( ) was marked as an API that reads input from the user. In this case we say that the readstring( ) API is a source of taint. The first time the value becomes tainted, a SetTaintedTrace object 602 is created, and is associated with the ValueProperties object 306 This contains an STL set 603 to house a set of tainted traces. (Note: STL=C++ Standard Template Library, and according to C++ conventions objects from STL are prefixed with "std::".) Initially a single TaintedTrace object (for example 605) is put in the set. The TaintedTrace has associated with it a list of TaintedTraceElements representing the flow of taint to this point. Thus, if the simulated execution of routine D 404 was a source of taint, the TaintedTraceElement 605 would have been created at this time and it would record that the taint started in routine 404. If the simulated execution of routine C 405 propagates the taint, the TaintedTraceElement 606 would be created. Thus 605, 606, 607, and 608 represent the flow of taint through procedures D, C, E, and back to C, and these point to the CallPaths objects 504, 503, 505, 503 in FIG. 5, which in turn corresponds to the flow through the dynamic callgraph 404, 403, 405, 403 in FIG. 4. Additional TaintedTrace objects are created and added into the set if the simulated execution encounters other sources of taint.

Figure 7:
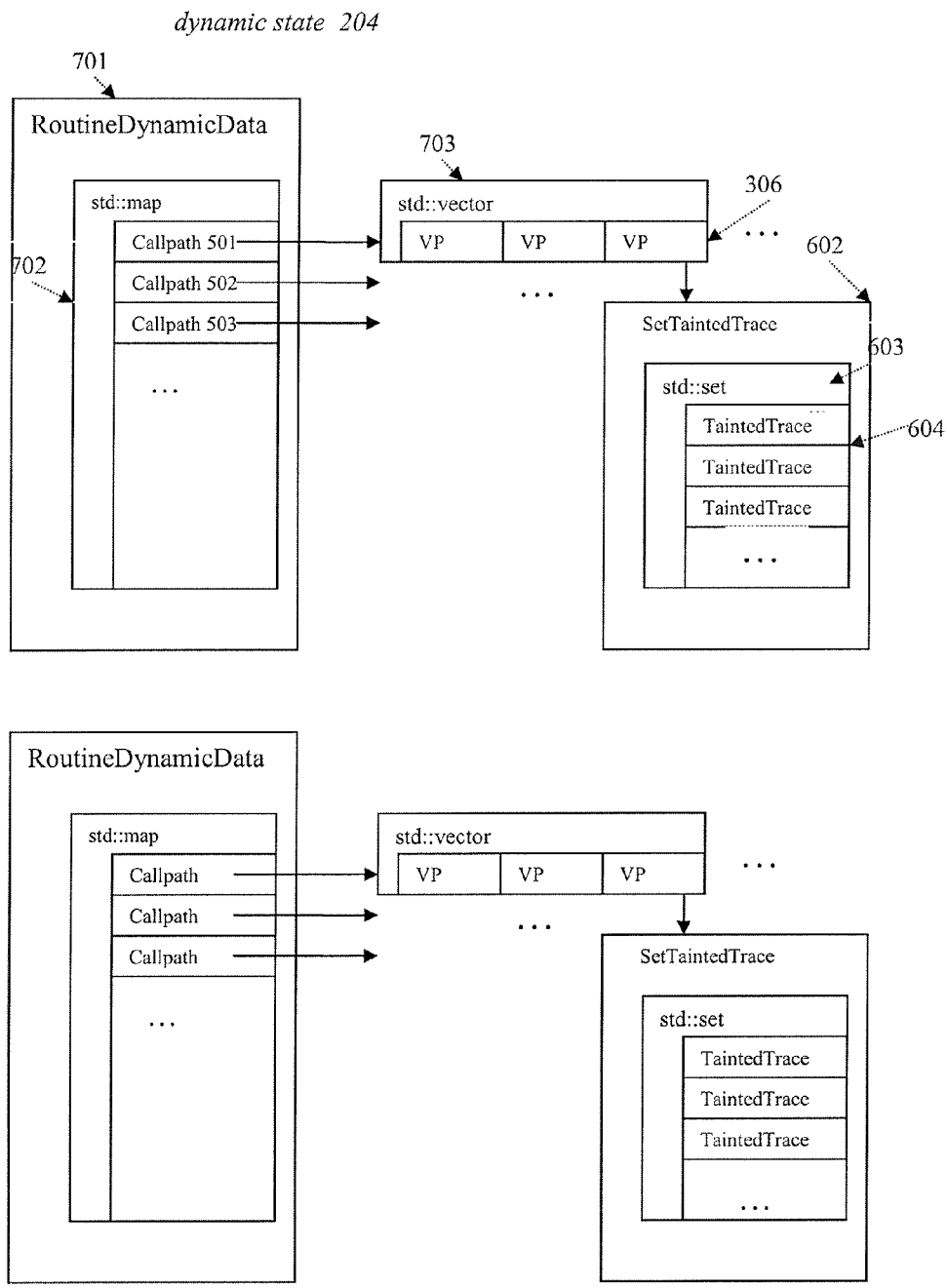
FIG. 7 shows the structure of the dynamic state 204 built up as the target application is analyzed.

The value-properties and tainted trace data shown in FIG. 6 is initially associated with each Variable object in the IPVA representation (from FIG. 3). However, as the interprocedural analysis runs and walks the dynamic callgraph, there arises the need to save many ValueProperties objects for each Variable, and a need to organize all these ValueProperties in a way that corresponds to the dynamic simulation of the program, rather than the static program structure of FIG. 3. We call all this saved data the "dynamic state". This was illustrated in FIG. 2 with a "dynamic state" oval 204. FIG. 7 is a data structure diagram showing exemplary dynamic data state in more detail. To further motivate the data organization of FIG. 7, consider the routine C of FIG. 4 which has a single Routine object in the IPVA representation 301, but is called from two places in the dynamic callgraph (in FIG. 4, 403 and 406). Routine C has a bunch of Variables 303, each of which has a ValueProperties 601. The issue is that we need to save a different ValueProperties for each time the routine C is called. That is what the "dynamic state" is saving, and what FIG. 7 is showing. The RoutineDynamicData object 701 houses this information for a particular routine (e.g., routine "C" from the above example). 702 is an STL map whose index identifies all the places (Callpaths) that the routine was called in the dynamic callgraph. Thus the indices of that map 501, 502, 503, etc, are the Callpath objects from FIG. 5. The values at each map index are STL vectors 703 containing a vector of ValueProperties objects 306 saved at this index position. There is one ValueProperties objects for each variable in the routine; thus this vector is the saved-off state from FIG. 3 for one call to this routine. Item 602 is the SetTaintedTrace object associated with one of the ValueProperties. The objects below that 603, 604, etc, have the same detail-level structure as depicted in FIG. 6 (not shown to that level of detail in FIG. 7).

The security analysis is ultimately interested in following the paths of tainted data to see if any tainted data reaches special routines that are identified as potentially vulnerable APIs to tainted data, and if so the analysis will report such findings so that a user-developer may take appropriate action, e.g., modifying the code to account for the taint by testing or constraining the data to legitimate values. To discover this, the Assess Pass 206 iterates through the data structures we have just described in FIGS. 5, 6, and 7 to gather the call sites 105 that turn into candidate findings 108 that ultimately may turn into findings 111.

It should be understood that in a real-world analysis of a typical target application, the number of objects in each of FIGS. 3, 4, 5, 6, and 7 will be in the thousands or perhaps even millions. The drawings given here are just to illustrate the structures, and are not drawn at the scale they would exist in a real security analysis.

It should be apparent from this discussion that the security-analysis problem may be extremely memory-intensive. We can identify a number of reasons for this: (A) It works on a parsed program representation (FIG. 3) which can grow quite large if large target applications are being analyzed. (B) Its operation involves walking or traversing a potentially large dynamic call-graph (FIG. 4), some representation of which must be stored in memory (FIG. 5). (C) The stored trace data (FIG. 6) contains path-sensitive information that scales with the number of paths in the dynamic call-graph. (D) The stored trace data must be saved per node of the dynamic callgraph (FIG. 7), creating a further multiplicative effect. For these reasons we believe that the security-analysis problem has a large essential memory complexity (meaning that any solution to the problem will require a lot of memory).

Application of Memory Manager to the Interprocedural Analysis Subsystem

Figure 8:
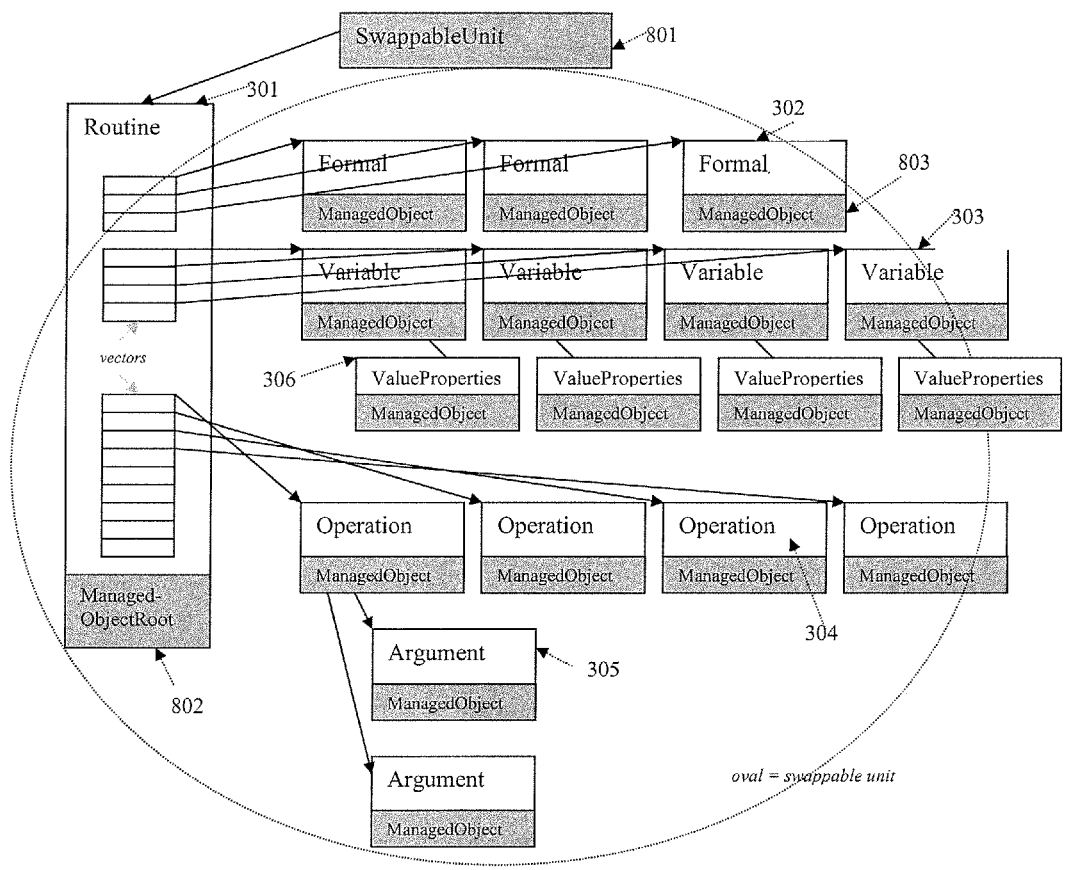

This section describes how the Memory Manager system integrates into the just-described Interprocedural Analysis subsystem to manage memory usage in that subsystem. The Memory Manager operates by swapping C++ objects to disk, thus freeing up the memory occupied by those objects. C++ objects that are candidates for swapping are derived from a ManagedObject base class. ManagedObject is part of the Memory Manager, but by virtue of being a base class, it is integrated with the objects it is managing. FIG. 8 illustrates how this works. FIG. 8 shows again the same C++ objects from FIG. 3 that are part of the IPVA representation, but this time they are shown with their ManagedObject base classes (shaded in gray). 803 is a representative example of a ManagedObject base class tightly bound with the Formal object it is managing.

Managed objects are preferably organized into groups called "swappable units" that are swapped together as a group. FIG. 8 also illustrates this. The large oval indicates one swappable unit, which consists of all the managed objects under a single Routine. We refer to this as "routine granularity" for swapping. What this means is that if this Routine is selected to be swapped out, then all the objects shown in FIG. 8 (the objects that constitute the static representation of the code in this Routine) will be collected together and swapped out at the same time to one place in the swap file. And if any of those objects are needed later, all of the objects in that Routine will be swapped in and reconstituted at the same time. A swappable unit has a root object, from which the system can find all the managed objects in the swappable unit. In FIG. 8, the Routine object 301 is the root object of the swappable unit. The root object is derived from a ManagedObjectRoot base class 802. There is also a SwappableUnit object 801 for each swappable unit, which is part of the Memory Manager. The SwappableUnit object itself is not swapped; it stays in memory and remembers important information about the swappable unit. This information includes: (a) If swapped out, where it was swapped to disk. (b) If swapped in, total size and last-used timestamp. This information will be used by the MemoryEstimation and SelectVictim subcomponents of the Memory Manager, as will be explained below.

Figure 9:
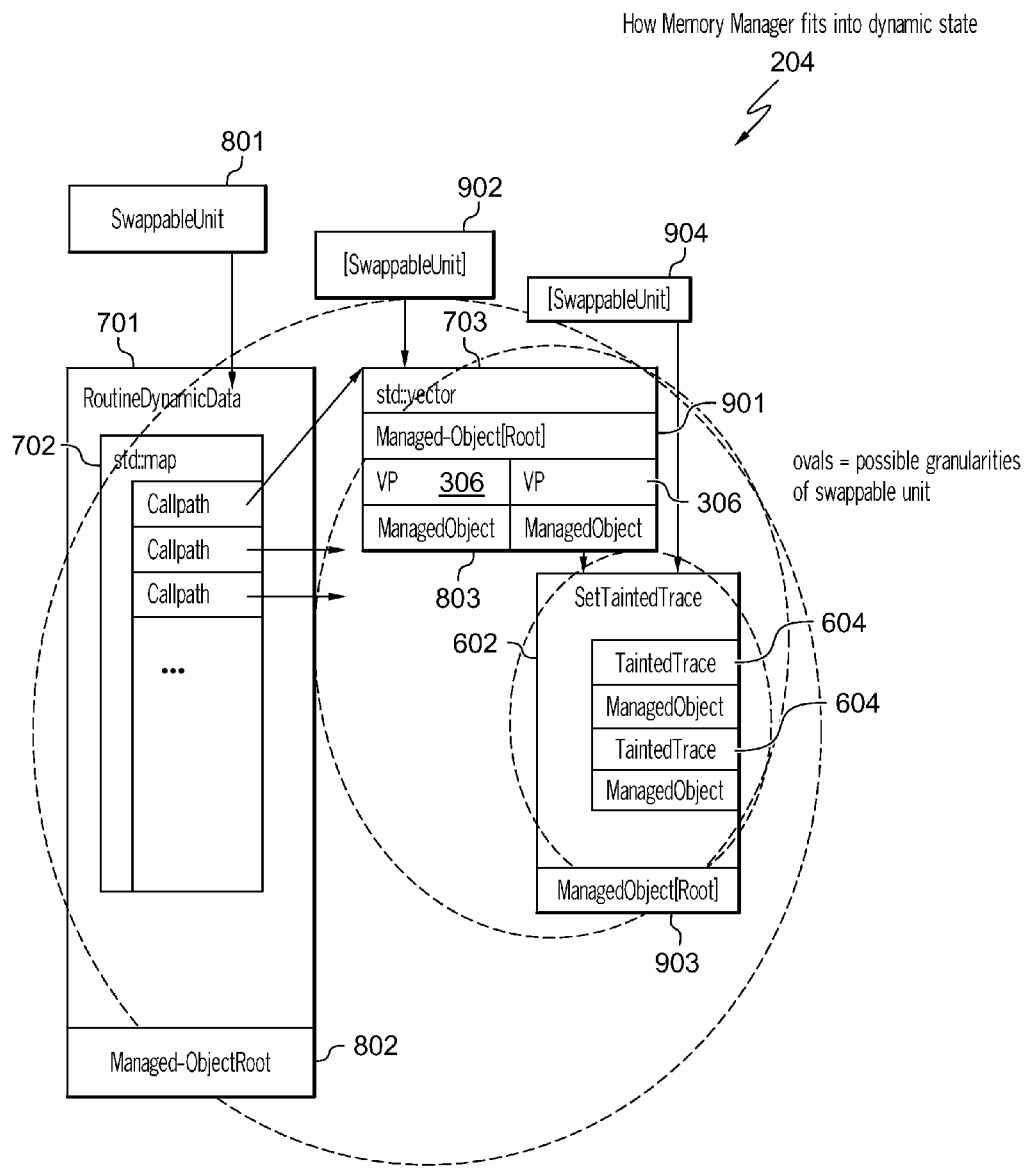
FIG. 9 shows how our Memory Manager base classes integrate with the objects from FIG. 7. These are additional points where our Memory Manager invention fits into the security analysis system.

FIG. 9 illustrates how these same concepts were applied the objects that constitute the dynamic state. Here we take the illustration of dynamic state from FIG. 7, and show how memory management base classes are applied to these objects. The large oval represents a swappable unit (with routine granularity) and the RoutineDynamicData 701 is the root of that swappable unit. Thus it derives from the ManagedObjectRoot base class 802. Here the individual managed objects are the vector-of-ValueProperties 703, each ValueProperties object 306, the SetTaintedTrace 602, and the TaintedTraces 604, each of which are shown deriving from the ManagedObject base class (all the gray boxes labeled ManagedObject, for example 803).

The smaller ovals in FIG. 9 need to be explained. As the analysis runs and collects more information, the number of objects under each RoutineDynamicData will grow. Unlike the objects under Routine (FIG. 8), which are of a fixed number depending on the size of the routine, the number of objects under each RoutineDynamicData (FIG. 9) grows as the routine is called from more places in the dynamic callgraph. This is because of the map (item 702) whose indices are Callpaths for places this routine is called, and the saved vectors (item 703), one of which is created for each place this routine is called. Eventually the total size of swappable unit (the large oval) gets un-manageably large (more below regarding how this decision is made). Thus, the Memory Manager 105 supports a flexible scheme by which certain container objects below RoutineDynamicData can "promote" themselves to be roots of their own swappable units (more below regarding how promotion is achieved). A medium-grained swappable unit has as its root the vector-of-ValueProperties 703. Its ManagedObjectRoot base class is 901 and its SwappableUnit object is 902. We put brackets around the SwappableUnit object because it does not come into existence until the vector-of-ValueProperties has been promoted. We put brackets around the "Root" part of ManagedObjectRoot in 901 because it is just a ManagedObject and not a ManagedObjectRoot until the vector-of-ValueProperties has been promoted. The finest-grained swappable unit is shown with the small oval, containing a SetTainted-Trace 602 that has by itself become a swappable unit. Again, its ManagedObjectRoot base class 903 and its SwappableUnit object 904 are shown in brackets because they do not come into existence until the SetTaintedTrace has been promoted.

The check for "has this swappable unit grown too large?" is done at swap-out time. In our preferred embodiment, the threshold for splitting up a RoutineDynamicData swappable unit (item 701) is 10 megabytes. After being split up, each vector-of-ValueProperties (item 703) in the RoutineDynamicData is its own swappable unit. So for example, if before the split-up we had one 10-megabyte swappable unit containing 100 vector-of-ValueProperties objects each of which is roughly 100K bytes, then after the split up we'd have 100 swappable unit's each of which is roughly 100K bytes, plus the original RoutineDynamicData swappable unit (which is now much smaller since it is just the RoutineDynamicData object itself: everything under it has been split off). After this split-up, the vector-of-ValueProperties swappable units may continue to grow due to the growing sets of tainted traces. A further split-up may happen later in which individual SetTaintedTrace objects become their own swappable unit. In our preferred embodiment, the threshold for this second split-up is when an individual SetTaintedTrace grows to over 100K bytes, then it is split off to be its own swappable unit.

Figure 10:
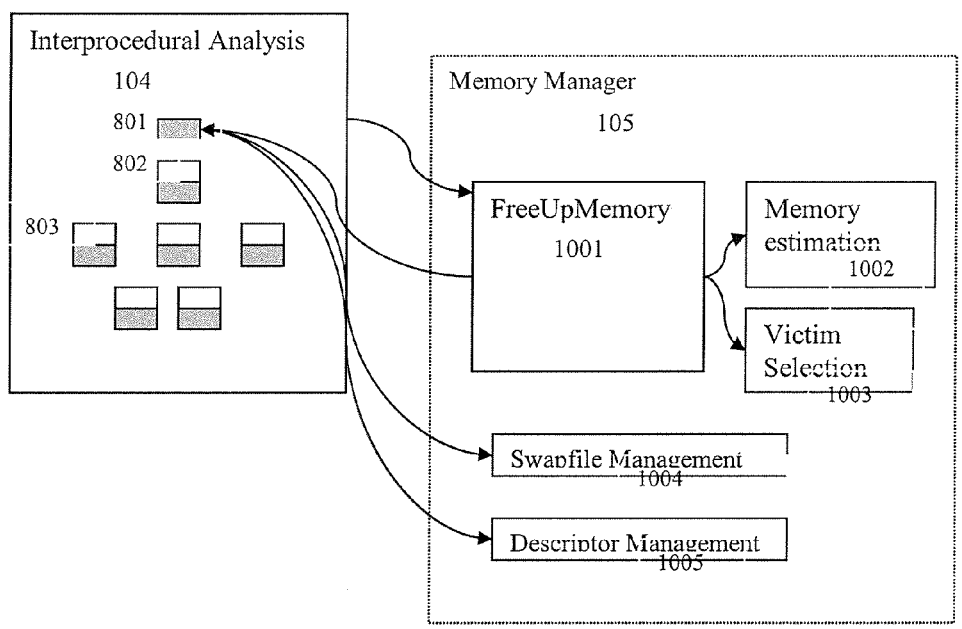
FIG. 10 shows the subcomponents of the Memory Manager invention.

The Memory Manager 105 thus includes the gray-shaded base classes from FIGS. 8 and 9, together with some higher-level memory management logic. FIG. 10 is an architectural diagram of the Memory Manager component 105, showing its subcomponents. The gray-shaded base classes inside the Interprocedural Analysis (for example 801 and 802 and 803 from FIG. 8) are actually a part of the Memory Manager. Also part of the Memory Manager is a FreeUpMemory subcomponent 1002, a Memory Estimation subcomponent 1002, a VictimSelection subcomponent 1003, a Swapfile Management subcomponent 1004, and a Descriptor Management subcomponent 1005. These will all be described in more detail below. Also shown in FIG. 10 (via the arrows) is the flow of control between these various subcomponents. The Interprocedural Analysis subsystem calls the FreeUpMemory subcomponent 1001 periodically to ensure enough free virtual memory is available. The FreeUpMemory component, in turn, calls the Memory Estimation subsystem 1002 and the Victim Selection subsystem 1003 to help make FreeUpMemory's decisions. Once VictimSelection chooses a set of victim swappable units, FreeUpMemory makes calls into the gray boxes e.g. 801, 802, 803 that are actually base classes of objects in the Interprocedural Analysis subsystem corresponding to the selected swappable units. Those in turn may call back into Memory Manager services such as SwapFile Management 1004 and Descriptor Management 1005 so that those components 1004 and 1005 will swap out the swappable unit and replace them with smaller descriptors (more below).

Figure 11:
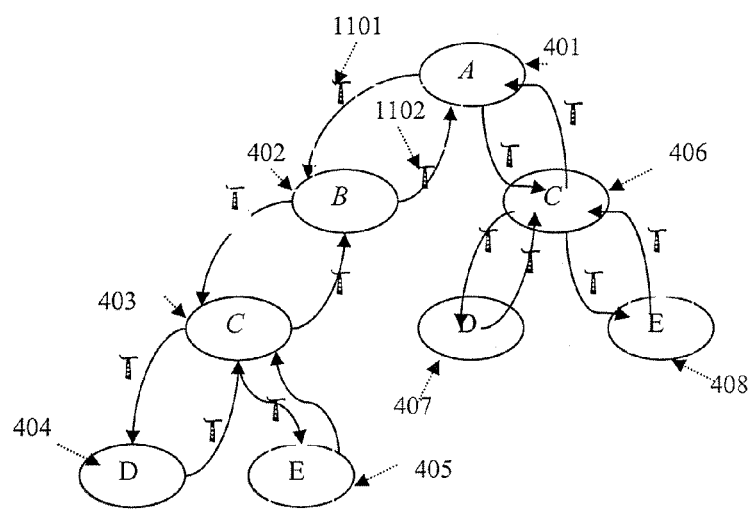
FIG. 11 shows the points where the Execution Engine 203 calls into the FreeUpMemory subcomponent 1001 of the Memory Manager.

FIG. 11 is a callgraph diagram but one which shows more explicitly the points at which the Interprocedural Analysis component 104 makes calls into the FreeUpMemory subcomponent 1001. Recall FIG. 4 showing the flow of the simulated execution done by the Execution Engine. FIG. 11 takes this same flow, and annotates with $T$ the points where calls into FreeUpMemory are made. These are the points at which the simulated execution is simulating calls (e.g. 1101 is the call from routine A to routine B) or returns (e.g., 1102 is the return from routine B to routine A).

Figure 12:
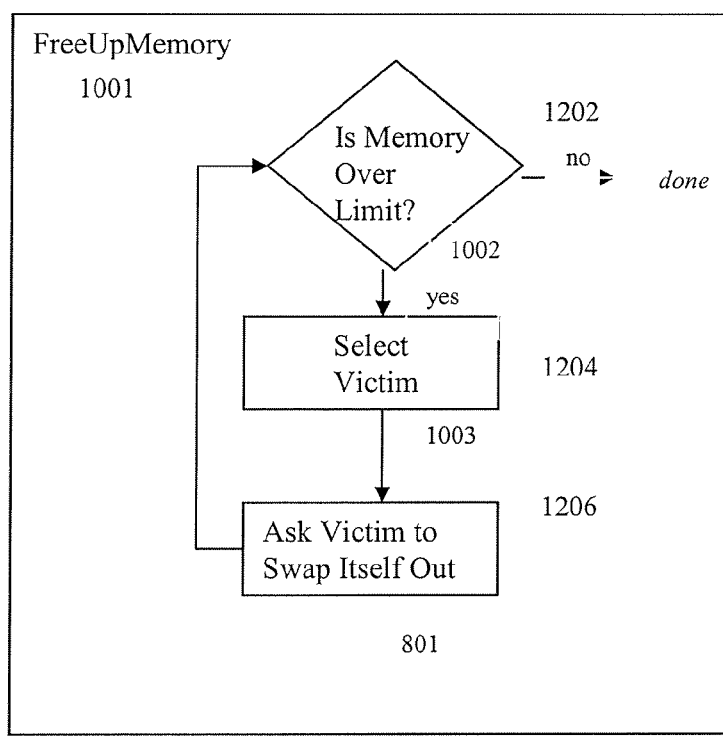
FIG. 12 shows the flow chart of the FreeUpMemory subcomponent of the Memory Manager.

FIG. 12 is a flow diagram, showing the internal logic of the FreeUpMemory subcomponent 1001. It first calls on the Memory Estimation subcomponent 1002 in step 1202 to ask if memory usage is over limit. If so, it calls the Victim Selection subcomponent 1003 in step 1204 to select a swappable unit to swap out. The selected SwappableUnit 801 is then asked to swap itself out in step 1206, thus freeing up some memory. We then loop back to see if memory usage is still over limit.

As stated above, preferred embodiments of the Memory Manager provide a Memory Estimation subcomponent. This Memory Estimation subcomponent need not give accurate-to-the-byte answers, but preferably is fast because it is called frequently. The basic idea of the Memory Estimation subcomponent is to use the on-disk sizes of the swappable units (which we have to compute anyway for swap-in/swap-out purposes) as a proxy or estimate for their in-memory sizes.

Figure 13:
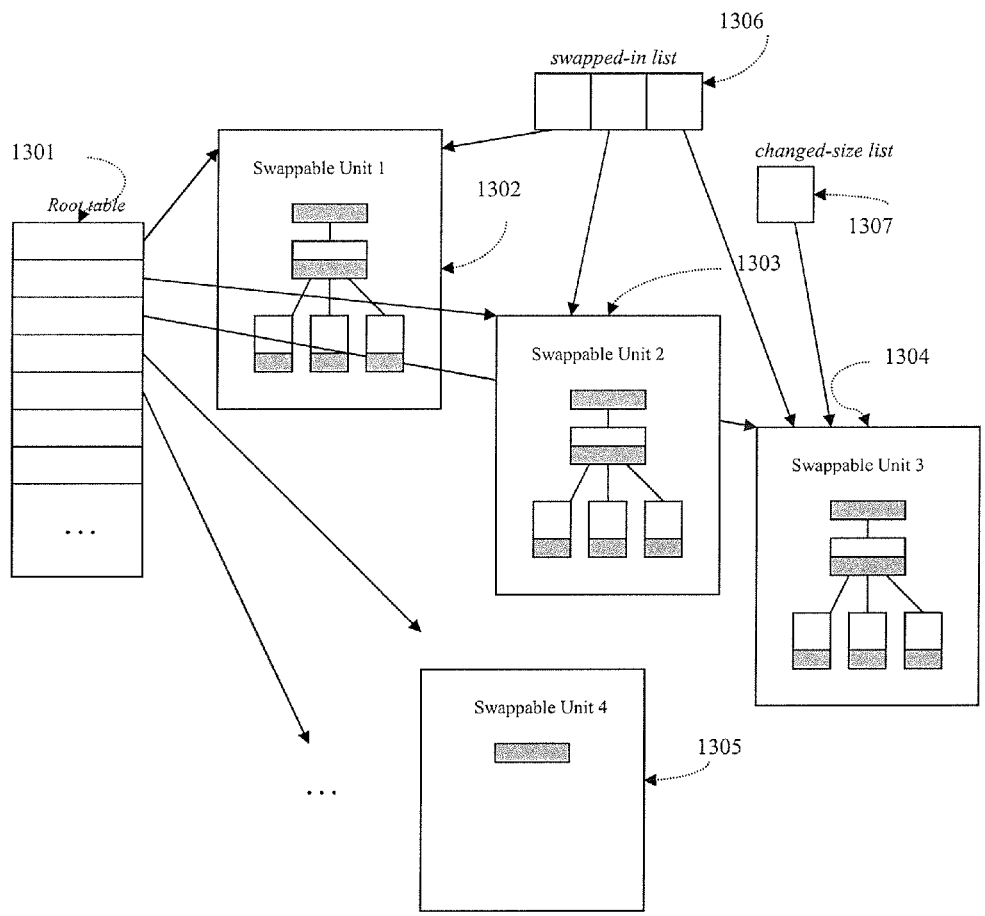
FIG. 13 shows the data structures used by the Memory Estimation and Select Victim subcomponents of the Memory Manager.

The architecture for the Memory Estimation subcomponent is shown in FIG. 13. In this diagram, 1302, 1303, 1304, and 1305 represent swappable units such as those shown in more detail in FIGS. 8 and 9, but here they are shown more abstractly. Each box is around the collection of objects that constitute the swappable unit. In this example, 1302, 1303, and 1304 are swapped in: all their objects are in memory. 1305 has been swapped out, so the box contains only its SwappableUnit object (shown in gray). The other objects that are associated with swappable unit 1305 have been swapped out, freeing their virtual memory, and are stored on disk. The remaining object in 1305 consumes a much smaller amount of virtual memory. The Memory Managers maintains 3 tables that let us quickly find things. The root table 1301 lets us find all swappable units whether they are in or out of virtual memory. The swapped-in list 1306 lets us find all swappable units that are in memory. The changed-size list 1307 lets us find all swappable units that have changed size since they were last swapped in. It is the responsibility of the code in the Interprocedural Analysis component to call the Memory Manager component to inform it that a swappable unit has changed size (e.g., due to a trace element being added to a trace).

Using this infrastructure, the Memory Estimation subcomponent operates as follows Always maintain a current-memory-size estimate On each swap-out and swap-in, adjust current-memory-size to account for the memory swapped out or in.

On an estimate-memory request, start with the current-memory-size. At the time of the estimate-memory request, this is accurate except for the accounting of any swappable units that have changed size since the last request: For these, the current-memory-size accounts for their old size, not their new size. So, we walk the changed-size set, re-computing sizes for the swappable units that have changed size and adjusting the current-memory-size estimate accordingly. At the end of the walk, we can clear the changed-size set since we have now accounted for all the swappable units that were in it. Thus it starts out cleared in preparation for the next estimate-memory request (and gets repopulated as swappable units change size between this estimate-memory request and the next estimate-memory request). The result of this algorithm is a good estimate of the current memory-in-use. This is fast because at estimate-memory time, we only need to examine those swappable units that have changed size, which is a small fraction of all swappable units.

The result of the estimate memory request is an estimated number of bytes of memory being occupied by all of our in-memory object, which is (as was shown in FIG. 12, step 1202) compared against some memory limit to decide if we need to swap anything out. The memory limit (above which we need to swap out) is by default set to a value just under 2 gigabytes, since most Windows computers have a 2-gigabyte virtual memory limit. The memory limit can be adjusted higher or lower by the user via a settings UI, in case the analysis is being run on a computer with a different virtual memory limit.

The job of the SelectVictim subcomponent 1003 is to choose which swappable unit to next evict from memory, when memory needs to be freed up. In preferred embodiments, the Least Recently Used heuristic is used to select a victim. This is based on the theory that, if the objects in a swappable unit have not been used for a long time, it is likely they will not be needed soon in the future. The SelectVictim subcomponent also makes use of the data structures illustrated in FIG. 13. In particular, it walks the swapped-in-list 1306 and examines the last-used time on each swapped-in swappable unit. It selects the one with the earliest last-used time as the victim.

Figure 14:
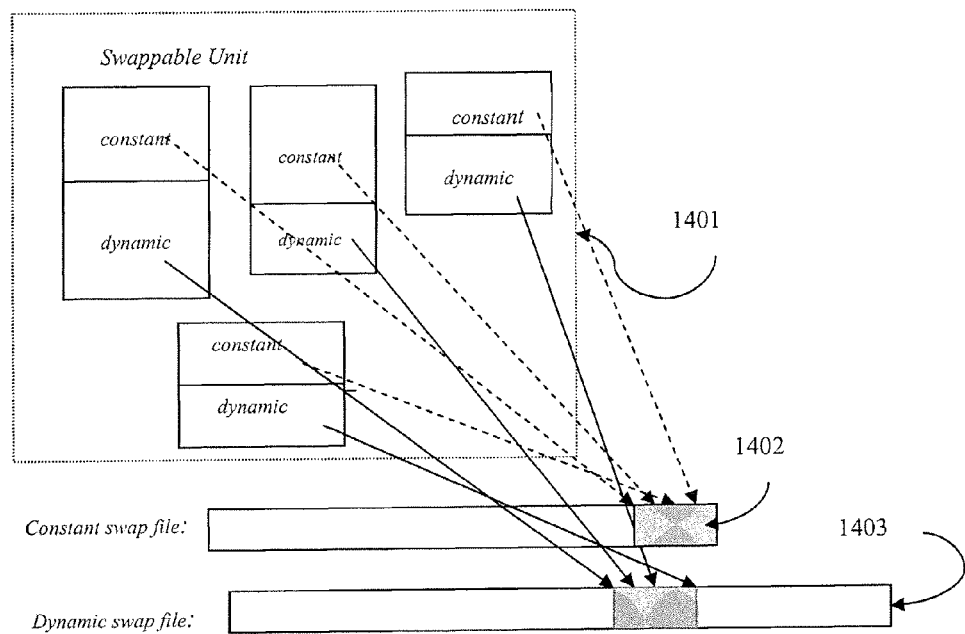
FIG. 14 illustrates a swappable unit being swapped out to its portions of the constant and dynamic swap files.

The job of the Swapfile Management subcomponent 1004 is, as its name suggests, to manage the swapfiles. On a swap-out of a swappable unit to disk, the SwappableUnit object will call the Swapfile Management services to find places in the swapfiles to write the SwappableUnit to. (We've already discussed, in the text accompanying FIG. 12, the conditions that trigger a swap-out.) On a swap-in of a swappable unit from disk, the SwappableUnit object will call Swapfile Management services to read the bytes back in from disk. (The conditions that trigger swap-in will be discussed below, in the text accompanying FIG. 18.) FIG. 14 shows pictorially aspects of the swapping process. We create two swapfiles at the start of static analysis using the memory management techniques discussed here. The constant swap file 1402 is where we will write all the constant (i.e. unchanging after object creation) fields of each object. The dynamic swap file 1403 is where we will write the dynamic (possibly changing) fields of each object. On a swap-out, the SwappableUnit 1401 rolls up the constant bytes of all it objects into a serialization buffer (via mechanism that will be discussed later), asks Swapfile Management for a place in the constant swapfile big enough to hold all those bytes, and writes them to that place. Then it gathers up all the non-constant bytes into a serialization buffer (again via mechanisms to be discussed later), asks Swapfile Management for a place in the dynamic swapfile, and writes them to that place. The two-swapfile approach should improve performance: The two swapfiles have different file management policies, each optimized for the kind of data the file will contain.

The constant swap file 1402 has a file management policy that operates as follows. The segment of the constant-data swap-file for a given swappable unit only needs to be written the first time the object is written out. On subsequent swap-outs, the constant-data can be "dropped" from memory: It does not need to be re-written to the swapfile since it is unchanging and the previously written bytes will do. On swap-in, we re-read those unchanging bytes from the same file location. Since we are always re-using that original file location for each swappable unit, holes do not arise in the file, so there is no free list and no logic to re-use holes as there is for the dynamic swap file (described in the next paragraph). New segments of the constant swap-file (representing a new swappable unit being swapped out for the first time) are simply appended to the end of the file. Hence, in FIG. 14 we show the constant bytes being written to a gray-shaded section at the end of the file.

Figure 15:
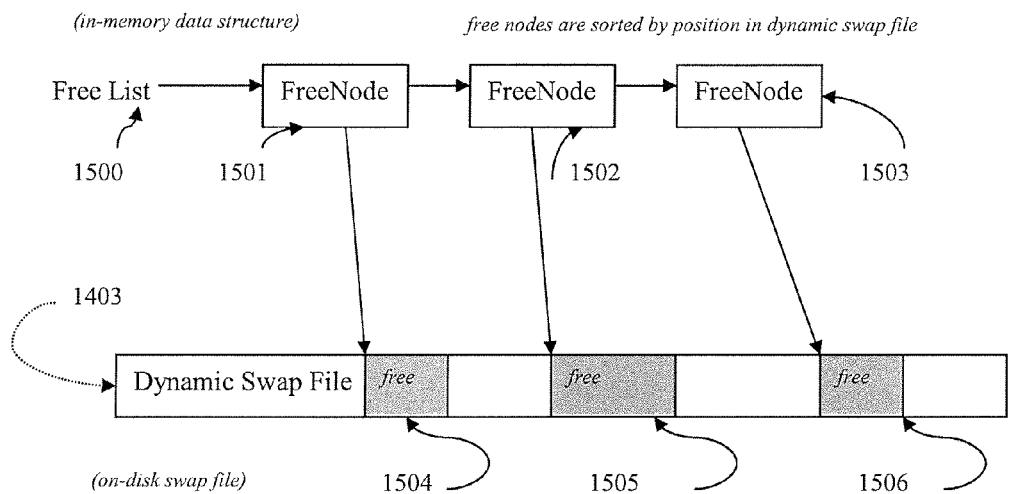
FIG. 15 shows the data structures to help manage the dynamic swap file.

The dynamic swap-file has a management policy that operates as follows. Since the non-constant data in a swappable unit can change size between swap-outs, a given swap-out may not be able to re-use its previous swap-file location, so numerous holes in the dynamic swap-file can arise. FIG. 15 shows the data structure used to keep track of those holes. The FreeList 1500 points to an in-memory list of all the free spots in the dynamic swap file. This consists of nodes 1501, 1502, 1503, etc, each describing a free segment in the dynamic swapfile (via file offset and size). The Free List is kept sorted by file offset, and nodes that describe adjacent free segments (with no in-use bytes between them) are coalesced. On a swap-in, we could immediately put the file segment we just read on the free list, but we do not immediately do so just in case the swappable unit's size is unchanged at swap-out time and we can re-use that segment. If the swappable unit's size has shrunk a swap-out time (rare), it's old segment in the Dynamic Swap File is divided up and re-used, and the not-used piece is put on the free list. If the swappable unit's size has grown at swap-out time, we then put its old (no longer big enough) segment on the free list, and search the free list for a free segment big enough to use (or be divided up and use one piece if it is bigger than needed). If there are no big-enough free segments, we extend the file at the end.

The division of our own objects into constant and dynamic fields is done manually at the time Memory Management is applied to the objects in the Interprocedural Analysis component. In general it is clear and obvious what fields belong in the constant bytes and what fields belong in the dynamic bytes. For example, the Routine object has a "name" field that is a String and represents the name of the routine, and the "name" field is swapped out with the constant bytes since a routine's name does not change during static analysis. As a counterexample, if the Routine has a "numberOfTimes-Called" field that is an integer representing the number of times this routine is called during our simulated execution, the "numberOfTimesCalled" field would get swapped out with the dynamic bytes since it is obviously changing during our analysis.

Memory Manager Low-Level Data Structures and Operation

Figure 16:
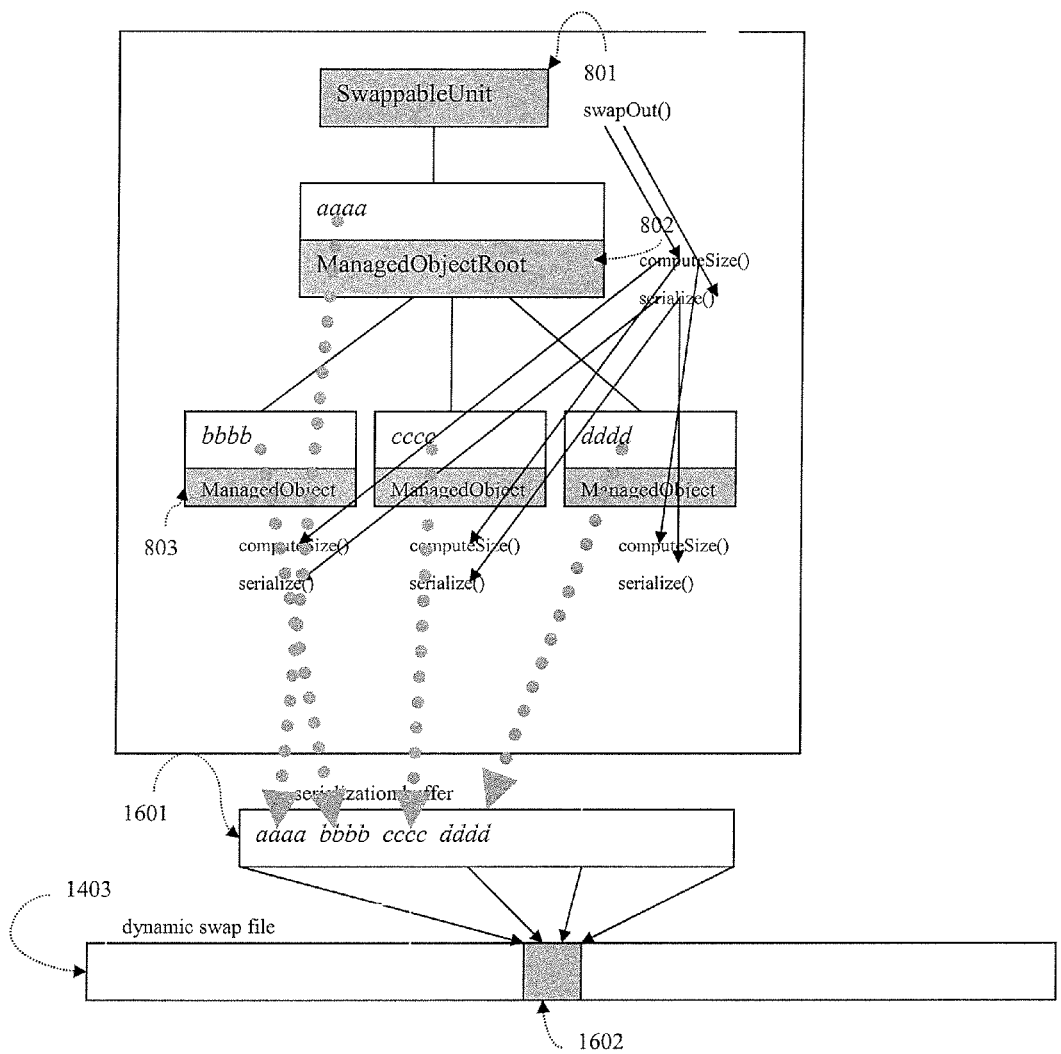
FIG. 16 shows the flow of events in a swap-out.

When a swappable unit has been selected as a "victim", it must be swapped out to disk. This is done by asking the swappable unit to swap itself out, via a call to a method called swapOut( ) in the SwappableUnit object's class definition at the top of the swappable unit. FIG. 16 shows in more detail the steps that are involved in swapping the swappable unit out of virtual memory. The following set of steps is done for the constant bytes (on the first swap-out), then the dynamic bytes (on all swap outs). Let us focus on the steps just for the dynamic bytes. First the swapOut( ) method in Swappable-Unit 801 calls a method called computeSize( ) in ManagedObjectRoot 802. That method in turn calls the compute Size( ) method in each of the ManagedObjects, e.g. 803, under it. The result of this is a total size of the number of dynamic bytes that need to be swapped out. An in-memory serialization buffer 1601 of this size is allocated. Then a method called serialized in ManagedObjectRoot is called to write the bytes to the serialization buffer. This in turn calls the serialized method in each of the ManagedObjects, e.g. 803, under it. Each serialized method writes the bytes of its managed object to a successive section of the serialization buffer. FIG. 16 shows this via the bytes aaaa, bbbb, cccc, dddd being written from each managed object to a separate section of the serialization buffer. (Of course, in real life the bytes are a collection of integers, strings, and other data in the object; we are just using text like "aaaa" to represent these bytes). The computeSize( ) and serialize( ) methods in each ManagedObject are hand-coded, and they call each other according to a pre-defined traversal algorithm for the hierarchical structure of the swappable unit. Finally the swapOut( ) method calls on the swapfile management code to allocate a place in a swap-file on disk storage (for example) to write the entire serialization buffer to, labelled 1602 in the figure, and it writes the buffer there. The SwappableUnit object remembers where it was written. The final step is that the swapOut( ) method can delete all of the objects under SwappableUnit, i.e. all the objects in the swappable unit except the top-level one that is remembering where the information was written out. The serialization buffer can be deleted at this point also. The objective of freeing up all the memory occupied by the swappable unit has been accomplished.

Figure 17:
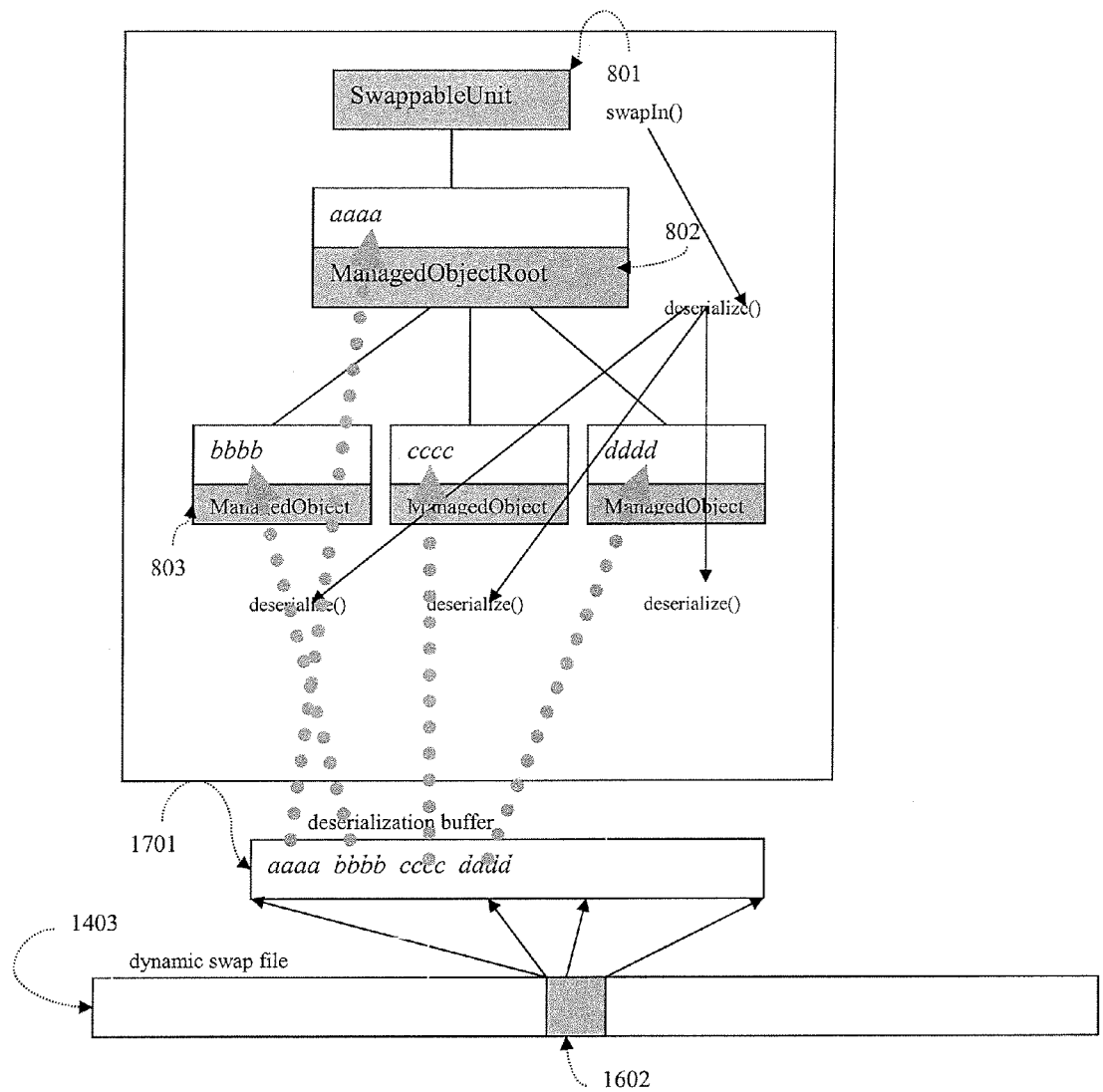

Swap-in is the inverse of swap-out. FIG. 17 shows the swap-in process. It is almost the same as FIG. 16, but the data is flowing the other way. The objects bytes are read from the swapfile into a deserialization buffer. swapIn( ) then constructs the root object of the swappable unit 802 and calls it's deserialize( ) method. This reads the bytes out of the deserialization buffer (aaaa in this example) back into the object. The deserialize( ) method then constructs the sub-objects, and calls their deserialize( ) methods to read their bytes into the respective object (bbbb, ccccc, and dddd in this example).

Figure 18:
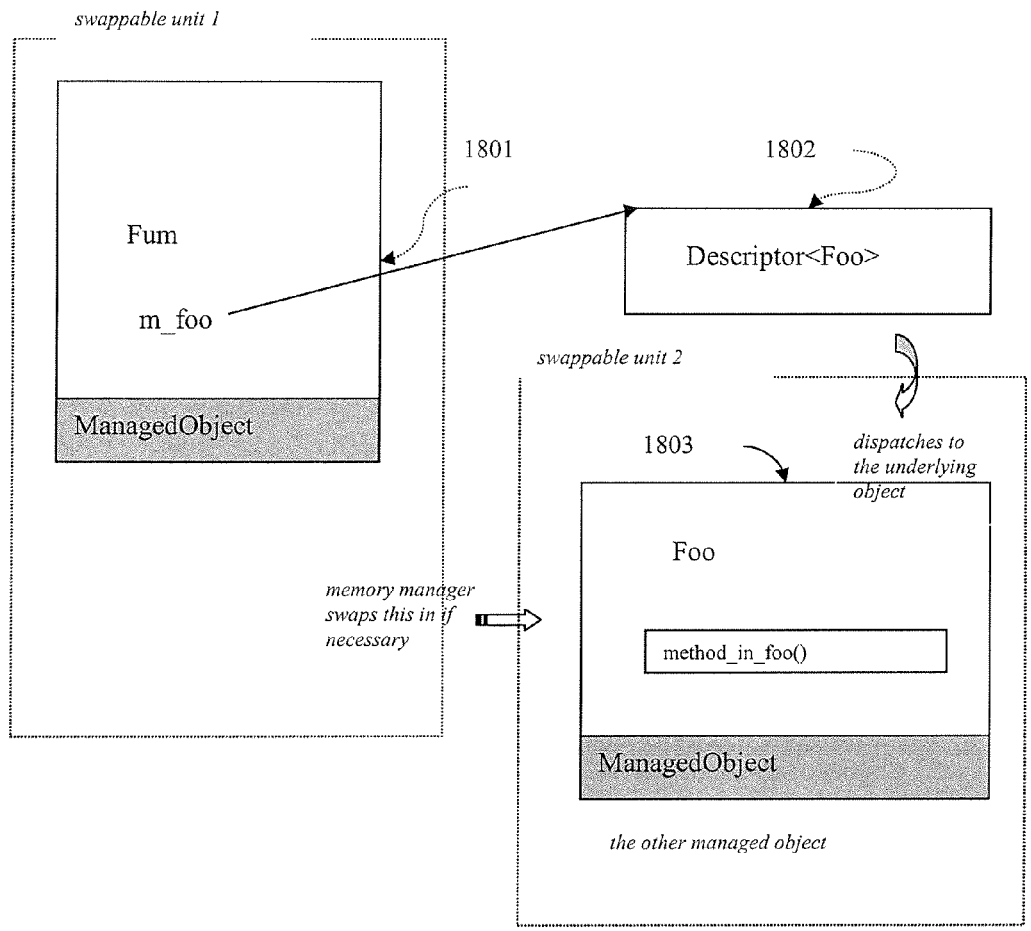
FIG. 18 illustrates a descriptor swapping in its underlying managed object.

SwapIn( ) is called only on demand, when an object in a swapped-out swappable unit is referenced and thus needs to be brought into memory. Descriptors are the mechanism by which this happens. FIG. 18 illustrates the idea behind descriptors. Consider a pair of managed objects which we will call Fum 1801 and Foo 1803, stored in different swappable units swappable unit 1 and swappable unit 2. For present purposes, assume Fum has a field m_foo that is a reference to Foo. Prior to applying Memory Manager, this would have been a pointer, e.g., expressed in C source code as "Foo*m_fum". However, in memory-managed code, Fum can no longer hold a pointer to Foo since Foo may be swapped out. Instead, Fum holds a pointer to a descriptor for Foo 1802. A descriptor is a small memory-resident object that caches either a pointer to its underlying object (when the underlying object is in memory), or enough information to know what swappable unit to swap in and how to re-establish the pointer once that swappable unit is swapped in This identifying information in the descriptor is detailed in the next paragraph.

Each descriptor contains a root id which is an integer identifying the swappable unit owning the descriptor's underlying object. FIG. 21 shows the fields of a descriptor, and there you can see the m_root_id field 2103. The root table 1301 of FIG. 13 can then be used to look up this root id, to find the SwappableUnit object for the swappable unit this descriptor's underlying object belongs to. The swapIn( ) method on that SwappableUnit object can then be called to swap in the entire swappable unit, which will cause all the objects in the swappable unit to be re-created in memory, including the descriptor's underlying object.

Now let us consider a reference through a descriptor. In the good case where the underlying object is in memory, the cost of going through a descriptor is just an extra dereference. In the bad case where the underlying object is not in memory, the reference through the descriptor is expensive because a swappable unit must be swapped in. However, in both cases the reference is transparent, meaning that the code performing the reference (e.g. "m_foo->method_in_foo( )" looks like an ordinary call through a pointer. This is accomplished via the magic of C++ templates and overloaded operator->( ), as will be explained below when we go into descriptor details. This transparency is important for minimizing code changes when Memory Manager is applied to an existing body of software.

Figure 19:
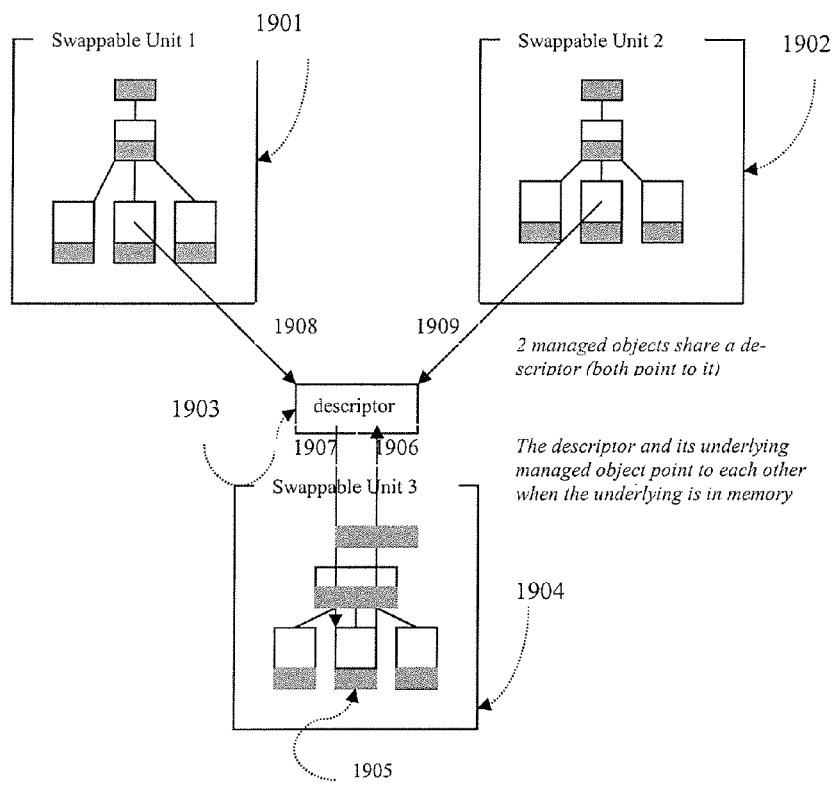
FIG. 19 shows the relationship between a descriptor and the managed objects that reference it and the managed object that underlies it.

Descriptors are small objects that are stored in memory alongside the managed objects which they represent. FIG. 19 illustrates this. The descriptor object 1903 stays in memory and represents the managed object 1905 whether that object is in memory or swapped out. Exactly one descriptor is allocated for that managed object, and all other objects that reference that managed object point to the same descriptor. The figure shows two managed objects pointing to the descriptor, one in swappable unit 1901 and one in swappable unit 1902. When the descriptor's underlying object 1905 is in memory, as shown in the figure, the descriptor has a pointer to the underlying object and the underlying object has a pointer back to the descriptor. The back-pointer from the managed object to the descriptor lets us implement descriptor-sharing easily because we can easily find the existing descriptor for a given object. It also allows us to "fix up" the forward pointer (descriptor-to-managed-object) at swap-in time, when the managed object re-appears at a new address. The contents of a descriptor and the mechanism for finding and fixing up descriptors will be discussed in more detail a few paragraphs hence, after we have shown in detail the fields of ManagedObject (FIG. 20) and the fields of Descriptor (FIG. 21).

Both of the ManagedObject and Descriptor classes are preferably small because there are many instances of them. FIG. 20 shows the important methods and fields of ManagedObject. The purpose of the computeSize( ) method 2001, the serialize( ) method 2002, and the deserialize( ) method 2003 have already been explained. Note these are pure virtual methods in the ManagedObject base class, meaning they just specify an interface that must be implemented or defined in every class that derives from it. The data fields of ManagedObject are shown in 2004. These support the functions described above in just two words (64 bits) of memory. C++ union is used here as a space-saving technique.

Descriptors are also numerous and are kept small. FIG. 21 shows the fields in a descriptor in 2101. These also use a C++ union to encode the necessary information in just 2 words (64 bits). We then wrap this DescriptorBase class in a template class shown in 2102, which lets us take advantage of C++'s ability to overload the * and -> operators. Descriptors for a given type, e.g. ValueProperties, are thus instantiated using the C++ syntax Descriptor<ValueProperties>.

The pointer going from a managed object to its descriptor was labelled as item 1906 in FIG. 19, and it appears as the m_descriptor field in FIG. 20 (also labelled as item 1906). The m_has_descriptor field right below it is a flag saying if this managed object already has a descriptor. Thus, when we need to create a reference to a managed object, from a different swappable unit, for example the references labelled as items 1908 and 1909 in FIG. 19, we query the managed object's m_has_descriptor field to see if the managed object already has a descriptor. If not, we create one. If it already has a descriptor, we can use the m_descriptor field to find it and thus establish the pointers 1908 and 1909 to the existing descriptor. In this way all references to the same managed object point to the same (one and only) descriptor for that managed object.

The pointer going from the descriptor to the managed object was labelled as item 1907 in FIG. 19, and it appears as the m_underlying_addr field, also labelled with 1907, in FIG. 21. The m_swapped_out field (just above it) is a flag saying whether the underlying managed object is swapped out or swapped in. If swapped in, the m_underlying_addr field 1907 is a pointer to the underlying managed object, and we use that to handle references through a descriptor in the cheap case where no swap-in is required. If the underlying object is swapped out, the m_underlying_addr field is not valid (it has no object to point to). Then a reference through the descriptor must do the expensive swap-in of the underlying object, as was described in the text accompanying FIG. 18. Once the managed object is swapped in, it's pointer-to-descriptor 1906 can be used to find the descriptor, and at that time the descriptors pointer-to-object 1907 can be "fixed up" (i.e. filled in with a now-valid pointer to the managed object).

Figure 22:
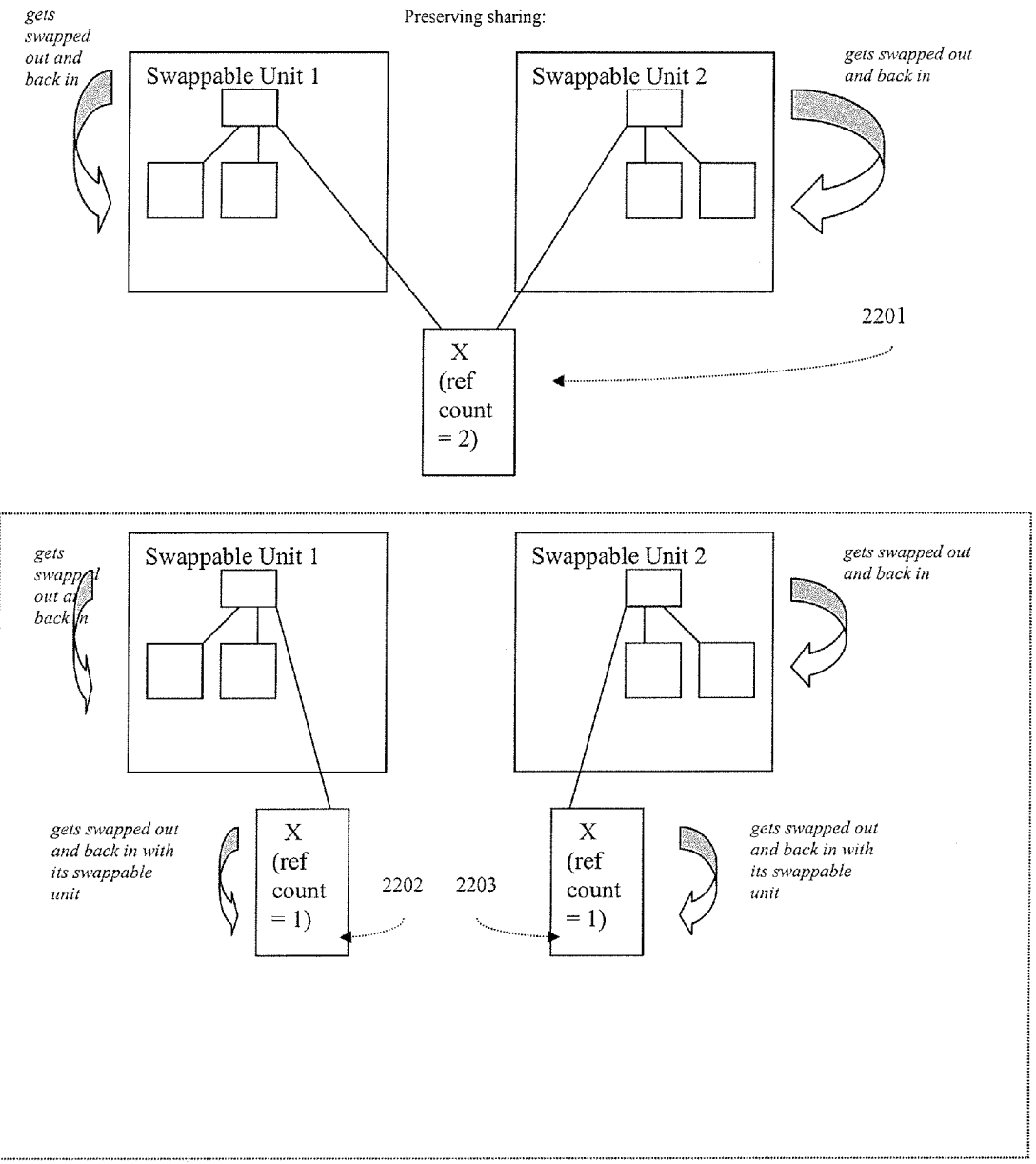

A final topic we want to touch on in the detailed description is the topic of sharing. The above description made the simplifying assumption that a given managed object always lives in exactly one swappable unit. In fact, it is possible for a managed object to be shared between two or more swappable units. For example, in FIG. 8 it is possible for 2 Variable objects from different swappable units will point to the same ValueProperties object. Similarly, TaintedTrace's and TaintedTraceElement's may be shared. FIG. 22 illustrates sharing of a managed object between two swappable units, and shows the two ways that the Memory Manager can deal with it. We distinguish between two kinds of sharing: (1) Essential sharing, where the object is shared because both references are to the same logical object. (2) Sharing for convenience, i.e., logically there are two distinct objects but they are being shared because they happen to have the same value at the present time. (Caching schemes may result in the second type of sharing).

The Memory Manager deals with case (1) (essential sharing) by ensuring the shared object 2201 remains locked in memory as long as any swapped-in or swapped-out references to it exist. By locking the shared object in memory, other objects can hold regular pointers to the shared objects and those pointers remain valid (unlike pointers to managed objects which might get swapped out and swapped in to different addresses; thus pointers to managed objects must be "descriptor"ized). The mechanism for locking shared objects in memory involves bumping the objects ref-count while a swapped-out reference to the shared object exists. Normally objects are deleted when their ref-count goes to 0, so bumping the ref-count prevents the shared object from being deleted and locks it in memory.

The Memory Manager deals with case (2) by simply breaking the sharing resulting in two separate objects 2202 and 2203. In other words, as a result of swapping out Swappable Unit 1, a copy of the shared object X went out to disk with it, and as a result of bringing Swappable Unit 1 back in, that copy of X got re-materialized in memory, so now we have 2 separate copies of X in memory with identical contents. This is what is meant by "breaking sharing". In this case this is OK, because we decided the sharing of X wasn't essential, it only existed to save memory. Since we can save as much or more memory by swapping one or both of Swappable Unit 1 and Swappable Unit 2 out to disk, it is OK to break sharing in this case.

Other Embodiments

While the invention has been described in connection with certain preferred embodiments, it will be understood that it is not intended to limit the invention to those particular embodiments. On the contrary, it is intended to cover all alternatives, modifications and equivalents as may be included in the appended claims. Some specific component organizations, data organizations, and source code languages are mentioned, but it is to be understood that these are given as examples only and are not intended to limit the scope of this invention in any manner. The remaining paragraphs in this section discuss briefly some alternative embodiments we have considered.

Figure 23:
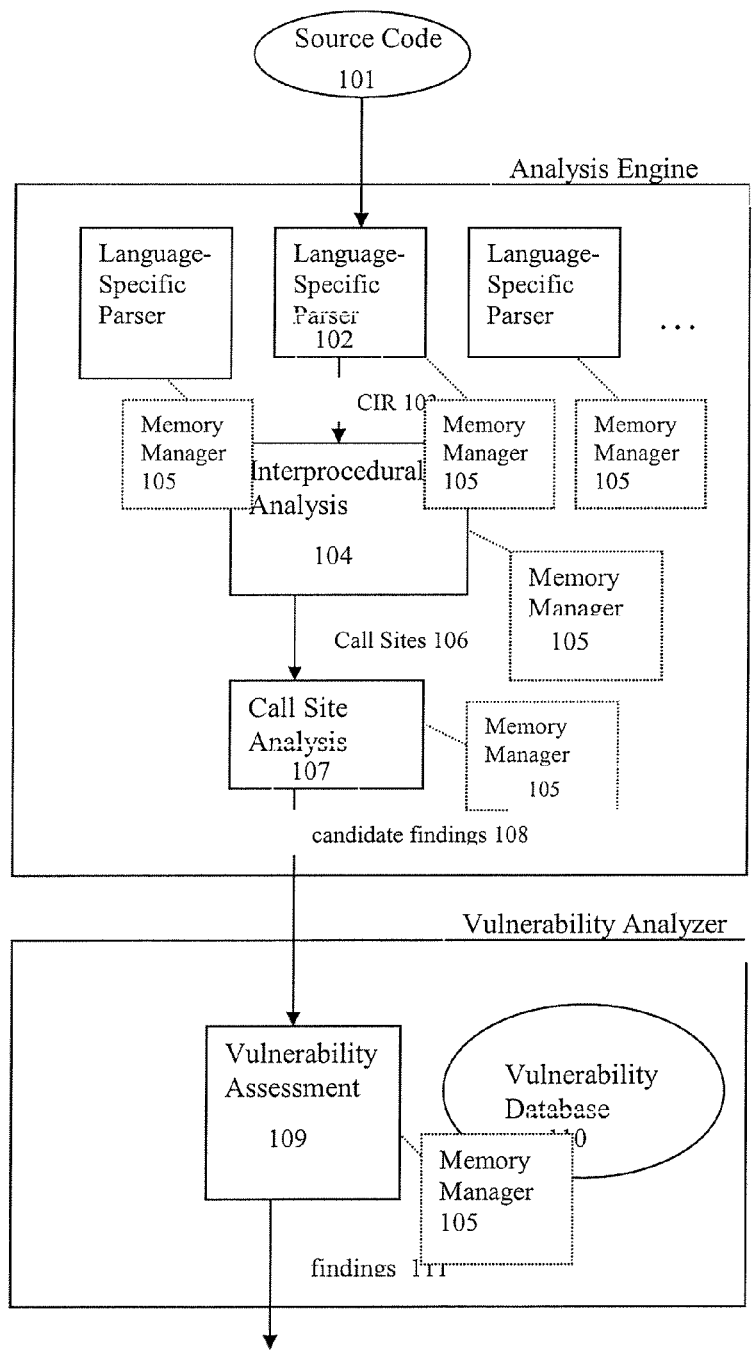
FIG. 23 shows an alternative embodiment in which the Memory Manager is applied to multiple components of the Security Analysis system.

Our detailed description was of the application of our Memory Manager to the Interprocedural Analysis component, since that is its current embodiment. However, an important and useful aspect of our Memory Manager is its flexibility. The fact that it is implemented as a set of C++ base classes, together with a small amount of supporting infrastructure, means that the Memory Manager could easily be applied to other subsystems of our Security Analysis system. FIG. 23 shows a possible future embodiment in which the Memory Manager has been applied to the Language-Specific Parsers 102, the Call Site Analysis component 107, and the Vulnerability Assessment component 109.

Figure 24:
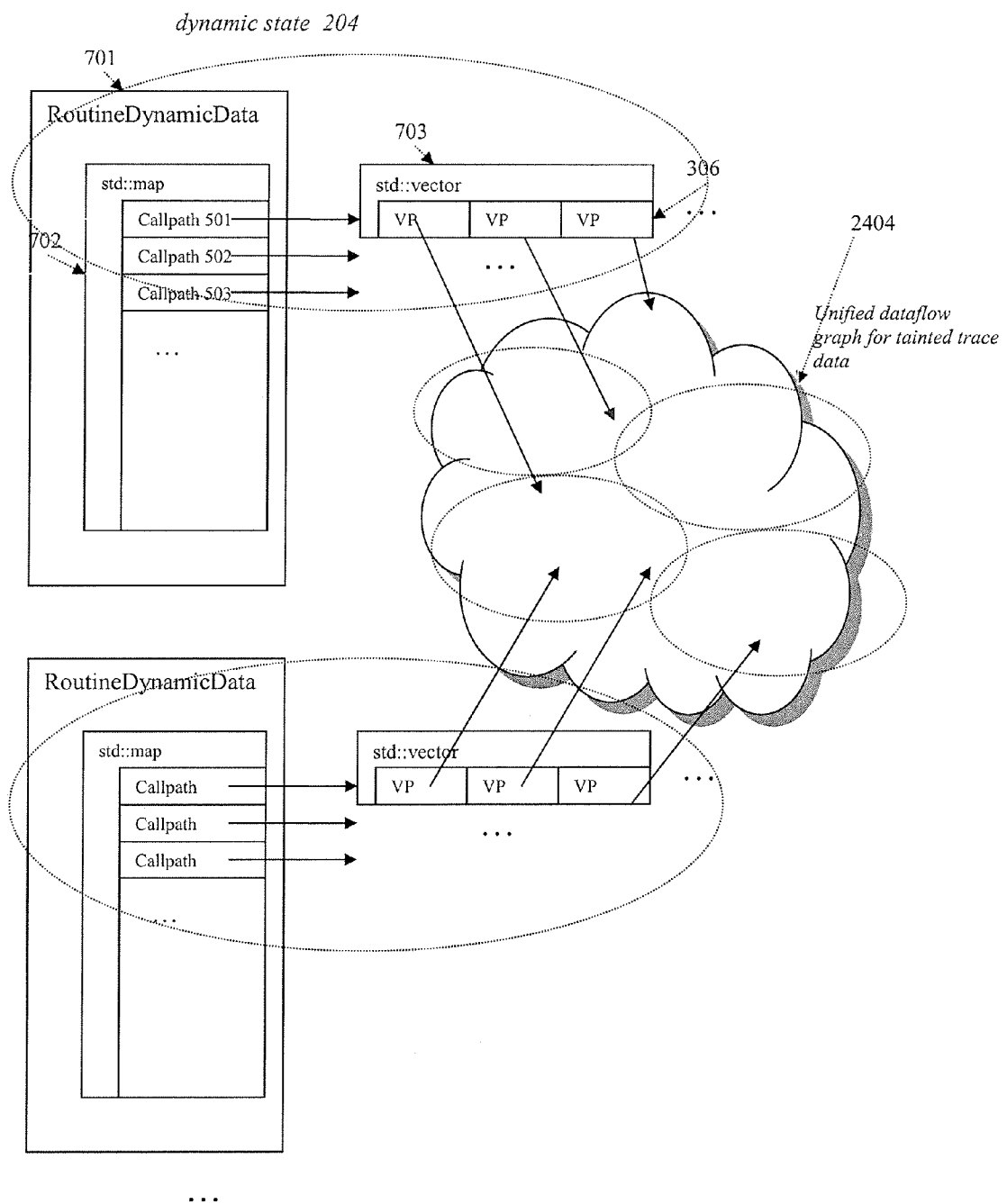
FIG. 24 shows an alternative embodiment in which the tainted trace data is organized as a unified dataflow graph.

An area where much variability is possible is how the security-analysis system organizes the dynamic data of FIG. 7, particularly the tainted trace data. An alternative to the sets-of-tainted-traces approach (one which we might move to in the future) would be to build a unified dataflow graph representing the flow of tainted data across the entire program. In this case, one would still want to swap portions of the dataflow graph since the overall graph would be quite large. The nodes of the graph would thus be managed objects. The organization of the graph into swappable units would need to be done dynamically. FIG. 24 illustrates in a very general and vague way how such an embodiment might look. This is the same as FIG. 7 except for the tainted trace data, which is shown here as a cloud 2404 representing that unified dataflow graph. The ValueProperties objects point into that graph. The ovals in FIG. 24 represent swappable units. As before the RoutineDynamicData objects are roots of swappable units, but the tainted trace "cloud" also is divided up into a number of swappable units (somehow).

C++ was described as the implementation language for both the security analysis system and the memory-management system managing its memory. C++ provides support for object-oriented programming with high performance. However, other implementation languages are certainly possible for a security-analysis system and for the Memory Manager. In a Java embodiment, a similar framework is possible, but the implementation would differ due to the presence or absence of certain language features. Java lacks multiple inheritance, so ManagedObject would be an interface rather than a base class. The high-level organization of objects as shown in the figures would remain the same, with pointers of course simply being references. The concept of a descriptor would remain, with cross-swappable-unit references being indirected through descriptors. Descriptors would reference their underlying objects (when the underlying is in memory) and the underlying would reference the descriptor, as in our C++ implementation. Java lacks operator overloading and C++-style templates, so references through descriptors cannot achieve the same level of transparency, but they are still possible. Java does have built-in support for serialization, but it is not clear a Java-based Memory Manager system would use it directly because more explicit control is needed of the serialization process. Instead, Java's reflection capability would probably be used to build a general-purpose serializer. All of the novel ideas of preferred embodiments of our invention, e.g. its memory-estimation technique, its separation of constant and non-constant swap-files, its variable-size memory and time granularities, are equally applicable to a Java-based system. Implementation of our invention in other languages would similarly have to be modified in accordance with the capabilities of the language.

While the invention has been described in connection with certain preferred embodiments, it will be understood that it is not intended to limit the invention to those particular embodiments. On the contrary, it is intended to cover all alternatives, modifications and equivalents as may be included in the appended claims. Some specific figures and source code languages are mentioned, but it is to be understood that such figures and languages are, however, given as examples only and are not intended to limit the scope of this invention in any manner.

What is claimed is:

1. A computer implemented method for application level management of virtual address space, the method comprising:

analyzing, by a static analysis application executed by a processor, a source code listing to create a call graph model to represent an expected sequences of routine calls as a result of a control flow of the source code listing;

analyzing, by the static analysis application, the source code listing while traversing the call graph model, and during traversal of the call graph model, generating dynamic state representing expected transformations of program variables as a result of one or more expressions in the source code listing and as a result of the control flow;

monitoring, by the static analysis application, an amount of virtual memory resources consumed by the dynamic state;

determining, by the static analysis application, whether a predetermined amount of the virtual memory resources is consumed by the dynamic state;

if the predetermined amount of the virtual memory resources is consumed, swapping out to a storage medium a portion of the dynamic state by the static analysis application, wherein swapping includes separating the portion of the dynamic state into a constant data portion and a non-constant data portion;

reusing at least a portion of the virtual memory resources corresponding to the swapped out portion of the dynamic state to continue analyzing the source code listing; and generating a report that identifies vulnerabilities in the source code listing.

2. The method of claim 1, wherein the call graph model includes paths and wherein at least one path is traversable a plurality of times depending on the expression of the source code listing.

3. The method of claim 1, wherein traversing the call graph model comprises propagating, at each call cite, accumulated knowledge of arguments at the call cite to formal parameters of the called routine.

4. The method of claim 3, wherein the accumulated knowledge is represented as a vulnerability lattice.

5. The method of claim 4, wherein propagating comprises linking one or more vulnerability lattices of the formal parameters to the vulnerability lattices of the corresponding arguments.

6. The method of claim 4, wherein propagating comprises adding tainted trace data to a plurality of vulnerability lattices, and wherein the tainted trace data represents the flow of tainted data to one or more arguments corresponding to the vulnerability lattice.

7. The method of claim 1, wherein swapping out to the storage medium the portion of the dynamic state comprises:
storing the constant data portion to a first swap file on the storage medium; and
storing the non-constant data portion to a second swap file on the storage medium.

8. The method of claim 7, wherein storing the constant data portion of the portion of the dynamic state to the first swap file comprises: appending the constant data portion to the swap file only the first time the constant data portion is stored.

9. The method of claim 7, wherein storing the non-constant data portion of the portion of the dynamic state to the second swap file comprises: using a free list to find an available segment of the second swap file to use for storing the non-constant data portion in the second swap file.

10. The method of claim 1, wherein swapping the portion of the dynamic state from the memory on the storage medium comprises:
checking an amount of free memory; and
storing the portion of the dynamic state from the memory to the swap file only when the amount of free memory is below a threshold.

11. The method of claim 10, wherein checking the amount of free memory is done automatically and periodically.

12. The method of claim 10, wherein checking the amount of free memory comprises: checking the on-disk sizes of the swapped out portions of the dynamic state.

13. The method of claim 10, wherein checking the amount of free memory comprises:
maintaining a changed-size list identifying the swapped out portions of the dynamic states that have changed in size; and
updating a previously stored estimate of free memory by generating new memory size estimates for the swapped out portions of the dynamic state on the change-size list.

14. A computer implemented system for application level management of virtual address space virtual memory resources provided to it by an operating system of the computer, the system comprising:
a memory configured to store the static analysis application executable by a processor, wherein the static analysis application, when executed by the processor, is configured to analyze a source code listing to create a call graph model to represent an expected sequences of routine calls as a result of a control flow of the source code listing, wherein the static analysis application is further configured to analyze the source code listing while traversing the call graph model, and during traversal of the call graph model, the static analysis application is further configured to generate dynamic state representing expected transformations of program variables as a result of one or more expressions in the source code listing and as a result of the control flow;
a monitoring component of the static analysis application configured to monitor an amount of virtual memory resources consumed by the dynamic state, and to determine whether a predetermined amount of the virtual memory resources is consumed by the dynamic state;
a swap management component, wherein if the predetermined amount of the virtual memory resources is consumed, the swap management component is configured to swap out to a storage medium a portion of the dynamic state, wherein swapping includes separating the portion of the dynamic state into a constant data portion and a non-constant data portion;
the static analysis application further configured to reuse at least a portion of the virtual memory resources corresponding to the swapped out portion of the dynamic state to continue analyzing the source code listing; and
the static analysis application further configured to generate a report that identifies vulnerabilities in the source code listing.

15. The system of claim 14, wherein the call graph model includes paths and wherein at least one path is traversable a plurality of times depending on the expression of the source code listing.

16. The system of claim 14, wherein traversing the call graph model comprises propagating, at each call cite, accumulated knowledge of arguments at the call cite to formal parameters of the called routine.

17. The system of claim 16, wherein the accumulated knowledge is represented as a vulnerability lattice.

18. The system of claim 17, wherein propagating comprises linking one or more vulnerability lattices of the formal parameters to the vulnerability lattices of the corresponding arguments.

19. The method of claim 17, wherein propagating comprises adding tainted trace data to a plurality of vulnerability lattices, and wherein the tainted trace data represents the flow of tainted data to one or more arguments corresponding to the vulnerability lattice.

20. The system of claim 14, wherein swapping out to the storage medium the portion of the dynamic state comprises:
   a first swap file on the storage medium for storing the constant data portion; and
   a second swap file on the storage medium for storing the non-constant data portion.

21. The system of claim 20, wherein storing the constant data portion of the portion of the dynamic state to the first swap file comprises: appending the constant data portion to the swap file only the first time the constant data portion is stored.

22. The system of claim 20, wherein storing the non-constant data portion of the portion of the dynamic state to the second swap file comprises: using a free list to find an available segment of the second swap file to use for storing the non-constant data portion in the second swap file.

23. The system of claim 14, wherein swapping the portion of the dynamic state from the memory on the storage medium comprises:
   the monitoring component further configured to check an amount of free memory; and
   swap management component further configured to store the portion of the dynamic state from the memory to a swap file only when the amount of free memory is below a threshold.

24. The system of claim 23, wherein checking the amount of free memory is done automatically and periodically.

25. The system of claim 23, wherein checking the amount of free memory comprises: the monitoring component further configured to check on-disk sizes of the swapped out portions of the dynamic state.

26. The system of claim 23, wherein checking the amount of free memory comprises:
   the monitoring component further configured to maintain a changed-size list identifying the swapped out portions of the dynamic states that have changed in size; and
   updating a previously stored estimate of free memory by generating new memory size estimates for the swapped out portions of the dynamic state on the change-size list.

* * * * *